United States Patent
Suzuki et al.

(10) Patent No.: US 8,284,670 B2
(45) Date of Patent: Oct. 9, 2012

(54) MOBILE COMMUNICATIONS SYSTEM, MOBILE COMMUNICATIONS METHOD, SERVER, TRANSFER DEVICE, AND MOBILE COMMUNICATIONS TERMINAL

(75) Inventors: Toshihiro Suzuki, Yokohama (JP); Ken Igarashi, Yokohama (JP); Satoshi Hiyama, Yokohama (JP); Hiroshi Kawakami, Yokohama (JP); Shoichi Hirata, Fuchu (JP)

(73) Assignee: NTT DoCoMo, Inc., Tokyo (JP)

( * ) Notice: Subject to any disclaimer, the term of this patent is extended or adjusted under 35 U.S.C. 154(b) by 1145 days.

(21) Appl. No.: 11/851,130

(22) Filed: Sep. 6, 2007

(65) Prior Publication Data

US 2008/0013483 A1 Jan. 17, 2008

Related U.S. Application Data

(63) Continuation of application No. 10/795,397, filed on Mar. 9, 2004, now abandoned.

(30) Foreign Application Priority Data

Mar. 12, 2003 (JP) .................................. 2003-067195

(51) Int. Cl.
*G01R 31/08* (2006.01)
*G06F 11/00* (2006.01)
*G08C 15/00* (2006.01)

(52) U.S. Cl. ............... 370/236.2; 370/253; 370/392; 455/432.1; 455/436

(58) Field of Classification Search ............... 370/236.2, 370/253, 392; 455/432.1, 436
See application file for complete search history.

(56) References Cited

U.S. PATENT DOCUMENTS

| 6,845,094 | B1* | 1/2005 | Zhang | 370/349 |
| 2002/0186693 | A1* | 12/2002 | Inoue et al. | 370/389 |
| 2002/0199015 | A1* | 12/2002 | Tari et al. | 709/238 |
| 2004/0240393 | A1* | 12/2004 | Nishida et al. | 370/253 |
| 2006/0052121 | A1 | 3/2006 | Suzuki et al. | |
| 2006/0262755 | A1 | 11/2006 | Kilgore | |

FOREIGN PATENT DOCUMENTS

| CN | 1342361 A | 3/2002 |
| EP | 1 376 973 A1 | 1/2004 |
| GB | 2 348 569 A | 10/2000 |

(Continued)

OTHER PUBLICATIONS

Ryuji Wakikawa, et al., "ORC: Optimized Route Cache Management Protocol for Network Mobility", Telecommunications, XP010637968, vol. 2, Feb. 23, 2003, pp. 1194-1200.

(Continued)

*Primary Examiner* — Olumide T Ajibade Akonai
*Assistant Examiner* — Jaime Holliday
(74) *Attorney, Agent, or Firm* — Oblon, Spivak, McClelland, Maier & Neustadt, L.L.P.

(57) ABSTRACT

A mobile communications system for transferring packets to a mobile communications terminal according to address information of the mobile communications terminal is disclosed. The mobile communications terminal is located in a moving network connected to a given node in a core network. The address information of the mobile communications terminal includes common information related to the given node to which the moving network is connected, and individual information which is unrelated to the given node to which the moving network is connected and is unchanged when the given node to which the moving network is connected is changed.

8 Claims, 19 Drawing Sheets

FOREIGN PATENT DOCUMENTS

| | | |
|---|---|---|
| JP | 10-13910 | 1/1998 |
| JP | 2000-341330 | 12/2000 |
| JP | 2001-197099 | 7/2001 |
| JP | 2001-268129 | 9/2001 |
| JP | 2002-185520 | 6/2002 |
| JP | 2002-374287 | 12/2002 |
| WO | WO 99/059301 | 11/1999 |
| WO | WO 00/41375 | 7/2000 |

OTHER PUBLICATIONS

Thierry Ernst, "Network Mobility Support in IPv6", Thesis Department of Mathematics and Computer Science, XP002215680, Oct. 29, 2001, pp. 1-101.

Ryuji Wakikawa, et al., "Basic Network Mobility Support draft-wakikawa-nemo-basic-00.txt", IETF Standard-Working-draft, Internet Engineering Task Force, XP015005661, Feb. 18, 2003, 23 pages.

Ichiro Okajima, et al., "Architecture and Mobile IPv6 Extensions Supporting Mobile Networks in Mobile Communications", VTC Fall 2001 IEEE 54th Vehicular Technology Conference, XP010562429, vol. 1 of 4, conf. 54, Oct. 7, 2001, pp. 2533-2537.

Thierry Ernst, et. al., "Mobile Networks Support in Mobile IPv6 (Prefix Scope Binding Updates)" IETF Standard-Working-Draft, Internet Engineering Task Force, XP015000834, No. 3, Mar. 2002, 23 pages.

James D. Solomon, "Mobile IP: The Internet Unplugged", Mobile IP, Chapter 12: Mobility in IP version 6, 1998, pp. 291-321 (with partial English translation).

Ryuji Wakikawa et al., The Internet Society, [Global Connectivity for IPv6 Mobile Ad Hoc Networks], http:/www.ietf.org/internet-drafts/draft-wakikawa-manet-globalv6-02.txt.

Hesham Soliman et al., The Internet Society, [Hierarchical Mobile IP], http://www.nal.motlabs.com/nemo/draft/draft-ietf-mobileip-hmipv6-06.txt.

"Mobile IP Technology", China Data Communications Net, Nov. 2000, No. 11, pp. 7-11 (with English Abstract).

James D. Solomon, "Mobile IP: The Internet Unplugged", Mobile IP, Jul. 27, 1998, 3 cover pages and pp. 292-321 (with English Abstract).

D. Johnson et al., "Mobility Support in IPv6 draft-ietf-mobileip-ipv6-21.txt", IETF Mobile IP Working Group, Feb. 26, 2003, 74 pp.

* cited by examiner

FIG.13A

| TERMINAL | LOCATION INFORMATION |
|---|---|
| MT#1 | CoA_MN (UNDER AN1) |
| MT#2 | CoA_MN (UNDER AN1) |
| ... | ... |

FIG.13B

| TERMINAL | LOCATION INFORMATION |
|---|---|
| MT#1 | CoA_MT1 |
| MT#2 | CoA_MT2 |
| ... | ... |

MOBILE COMMUNICATIONS SYSTEM, MOBILE COMMUNICATIONS METHOD, SERVER, TRANSFER DEVICE, AND MOBILE COMMUNICATIONS TERMINAL

CROSS REFERENCE TO RELATED APPLICATION

This application is a Continuation of U.S. Ser. No. 10/795,397, filed Mar. 9, 2004 and is based upon and claims the benefit of priority from the prior Japanese Patent Application No. P2003-067195, filed on Mar. 12, 2003; the entire contents of each are incorporated herein by reference.

BACKGROUND OF THE INVENTION

1. Field of the Invention

The present invention relates to a mobile communications system, a mobile communications method, a server, a transfer device, and a mobile communications terminal for supporting moving networks.

2. Description of the Related Art

A mobile communications system employing a Global v6 routing scheme is conventionally known as a mobile communications system for supporting moving networks. A mobile communications system employing a Hierarchical Mobile IP (HMIP) is also conventionally known as a mobile communications system for supporting moving networks.

In the mobile communications system employing the conventional Global v6 routing scheme, when a moving network is performing a handoff process, it is necessary to notify home agents of all mobile communications terminals within the moving network, of the movement. In the mobile communications system, it is also necessary to notify terminals as correspondent nodes of the movement, so as to implement route optimization during the handoff process of the moving network.

As a result, the mobile communications system causes increases in the amount of signals to be transmitted and handoff processing time during the handoff process of the moving network.

Specifically, as shown in FIG. 1, in the mobile communications system, when a moving network A moves, that is, when the connection to an access node AN to which the moving network A is connected is changed to another access node, address information of all mobile terminals (mobile communications terminals) MT #1 and MT #2 located in the moving network A is changed. Hereinafter, the address information of the mobile terminal is called the mobile terminal address information.

In the example of FIG. 1, a connecting node of the moving network A is changed from AN 1 to AN 2, and mobile terminal MT #1 address information (Care-of-Address [CoA]) is changed from "AN1prefix+#1" to "AN2prefix+#1," and mobile terminal MT #2 address information (CoA) is changed from "AN1prefix+#2" to "AN2prefix+#4."

At that time, in the mobile communications system, home agents HA 1 and HA 2 of the mobile terminals MT #1 and MT #2 and mobile terminals MT #3 and MT #4 as correspondent nodes are notified of the changed mobile terminal address information, thereby to be able to continue communication without breaking an optimized communication route.

In the mobile communications system, however, it is necessary to notify all home agents and correspondent nodes of the movement of the moving network A, requiring a large amount of signals and much processing time before the completion of update of the mobile communications terminal address information, and causing difficulty in supporting real time communication.

The mobile communications system performs Duplicate Address Detection (DAD) to prevent the address information (CoAs) on the mobile terminals MT #1 and #2 from being the same as that on other mobile terminals. There is thus a possibility that a portion following "AN1prefix" (e.g., #2) will be changed in a CoA newly provided when the moving network moves, causing an increase in time required for the update of the mobile communications terminal address information.

A mobile communications system employing the conventional HMIP, in which, instead of all home agents and correspondent nodes, a Mobility Anchor Point (MAP) is notified of the movement of a moving network, is thus superior to the above-described mobile communications system employing the Global v6 routing scheme.

In this mobile communications system, however, it is also required to update address information of all mobile communications terminals located in a moving network when the moving network moves, preventing a substantial reduction in handoff processing time.

Specifically, as shown in FIG. 2, in the mobile communications system, when a moving network A moves, that is, the connection to an access node AN to which a mobile node MN configured to manage the moving network A is connected is changed to another access node, address information of all mobile terminals (mobile communications terminals) MT #1 and MT #2 located in the moving network A is changed.

In the mobile communications system, the MAP placed in a core network 1 holds pieces of next hop destination information (CoA_MN) for transmission to all the mobile terminals MT #1 and MT #2 located in the moving network A, which information pieces are not correlated. It is thus required to transmit to the MAP individual update information on all the mobile terminals MT #1 and #2 located in the moving network A when the mobile terminal A moves, causing an increase in handoff processing time.

BRIEF SUMMARY OF THE INVENTION

The present invention has been made in view of the above problems, and has an object of providing a mobile communications system, a mobile communications method, a server, a transfer device, and a mobile communications terminal for supporting moving networks, which allow significant reductions in the amount of signals and processing time during handoff process.

A first aspect of the present invention is summarized as a mobile communications system for transferring packets to a mobile communications terminal according to address information of the mobile communications terminal. The mobile communications terminal is located in a moving network connected to a given node in a core network. The address information of the mobile communications terminal includes common information and individual information. The common information is related to the given node to which the moving network is connected. The individual information is unrelated to the given node to which the moving network is connected. The individual information is unchanged when the connection to the given node to which the moving network is connected is changed to another node.

A second aspect of the present invention is summarized as a mobile communications method of transferring packets to a mobile communications terminal according to address information of the mobile communications terminal. The mobile communications terminal is located in a moving network connected to a given node in a core network. The address information of the mobile communications terminals includes common information and individual information. The common information is related to the given node to which the moving network is connected. The individual information is unrelated to the given node to which the moving network is connected. A given mobile communications terminal located in the moving network detects change of the given node to which the moving network is connected. The given mobile communications terminal changes the address information of all mobile communications terminals located in the moving network, only by changing common information of the address information of the mobile communications terminals. The given mobile communications terminal notifies the mobile communications terminals located in the moving network of the change of the address information of the mobile communications terminals, and notifies an address management device configured to manage address information of the mobile communications terminals located in the moving network of the change.

A third aspect of the present invention is summarized as a mobile communications method of transferring packets to a mobile communications terminal according to address information of the mobile communications terminal. The mobile communications terminal is located in a moving network connected to a given node in a core network. The address information of the mobile communications terminals includes common information and individual information. The common information is related to the given node to which the moving network is connected. The individual information is unrelated to the given node to which the moving network is connected. The given node notifies a mobile node configured to manage the moving network of common information related to the given node. The mobile node changes the address information of all mobile communications terminals located in the moving network, only by changing common information of the address information of the mobile communications terminals according to the notified common information. The mobile node notifies an address management device configured to manage the address information of the mobile communications terminals in the moving network of the change of the address information of the mobile communications terminals.

A fourth aspect of the present invention is summarized as a server in a mobile communications system for transferring packets to mobile communications terminals according to address information of the mobile communications terminal. The mobile communications terminals are located in a moving network connected to a given node in a core network The server has an address information manager configured to manage the address information of all mobile communications terminals located in the moving network. The address information of the mobile communications terminals includes common information and individual information. The common information is related to the given node to which the moving network is connected. The individual information is unrelated to the given node to which the moving network is connected. The individual information is unchanged when the connection to the given node to which the moving network is connected is changed to another node.

A fifth aspect of the present invention is summarized as a transfer device provided on a packet transfer path in a mobile communications system for transferring packets to a mobile communications terminal according to address information of the mobile communications terminal. The mobile communications terminal is located in a moving network connected to a given node in a core network. The transfer device has an address information manager configured to relate the address information of the mobile communications terminal located in the moving network. The address information of the mobile communications terminal includes common information and individual information. The common information is related to the given node to which the moving network is connected. The individual information is unrelated to the given node to which the moving network is connected.

A sixth aspect of the present invention is summarized as a mobile communications terminal in a mobile communications system for transferring packets to mobile communications terminals located in the moving network connected to a given node in a core network according to address information of the mobile communications terminals. The mobile communications terminal has an address information manager configured to manage the address information of the mobile communications terminals located in the moving network. The address information of the mobile communications terminals includes common information and individual information. The common information is related to the given node to which the moving network is connected. The individual information is unrelated to the given node to which the moving network is connected.

BRIEF DESCRIPTION OF THE SEVERAL VIEWS OF THE DRAWINGS

FIGS. 13A and 13B are diagrams illustrating exemplary location information managed in the mobile communications system according to the third embodiment of the present invention;

DETAILED DESCRIPTION OF THE INVENTION

Configuration of Mobile Communications System in a First Embodiment of the Invention The configuration of a mobile communications system according to a first embodiment of the present invention will be described with reference to FIGS. 3 to 6.

Figure 1:
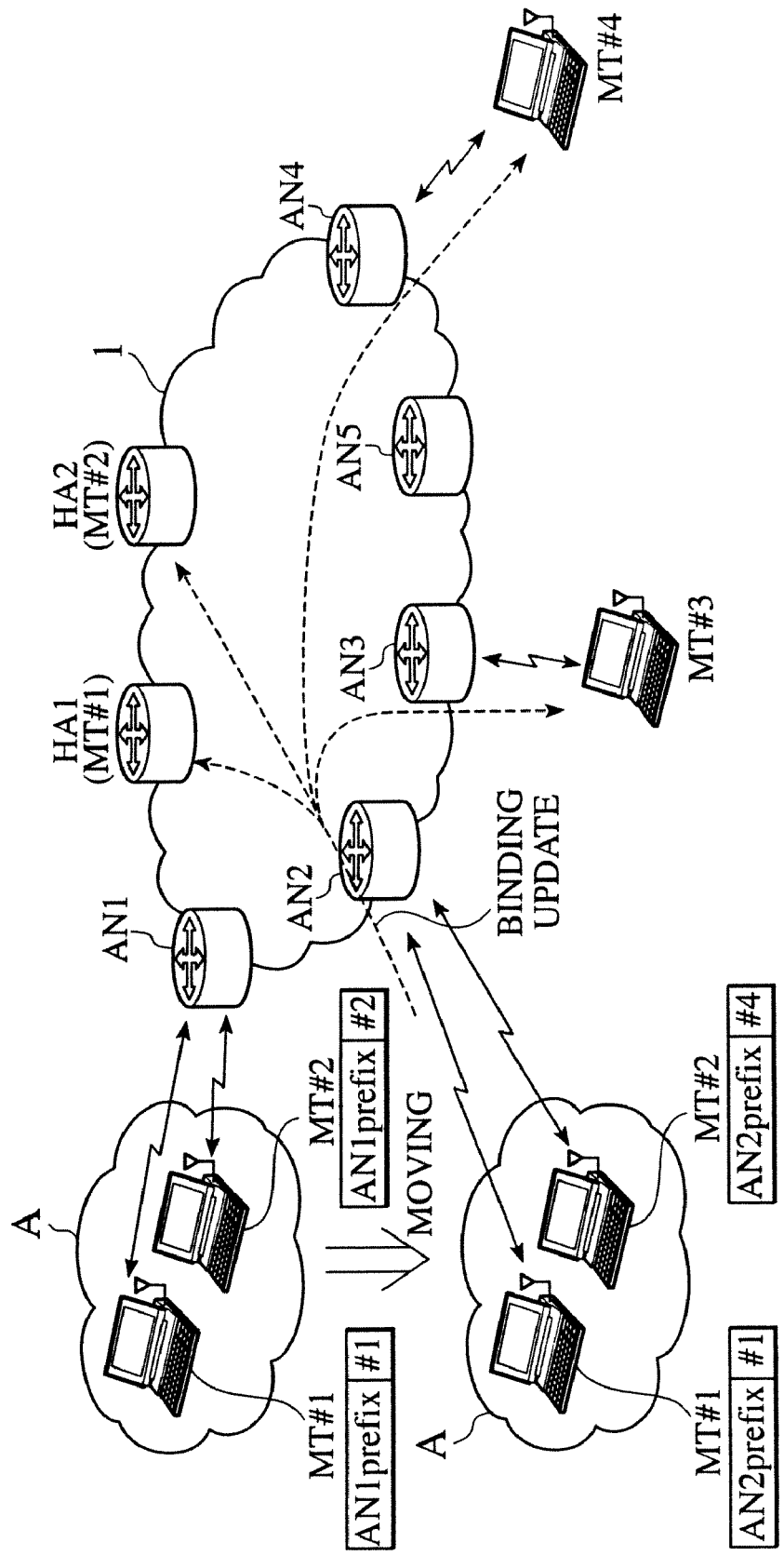
FIG. 1 is an entire block diagram of a mobile communications system according to a conventional art.
Figure 2:
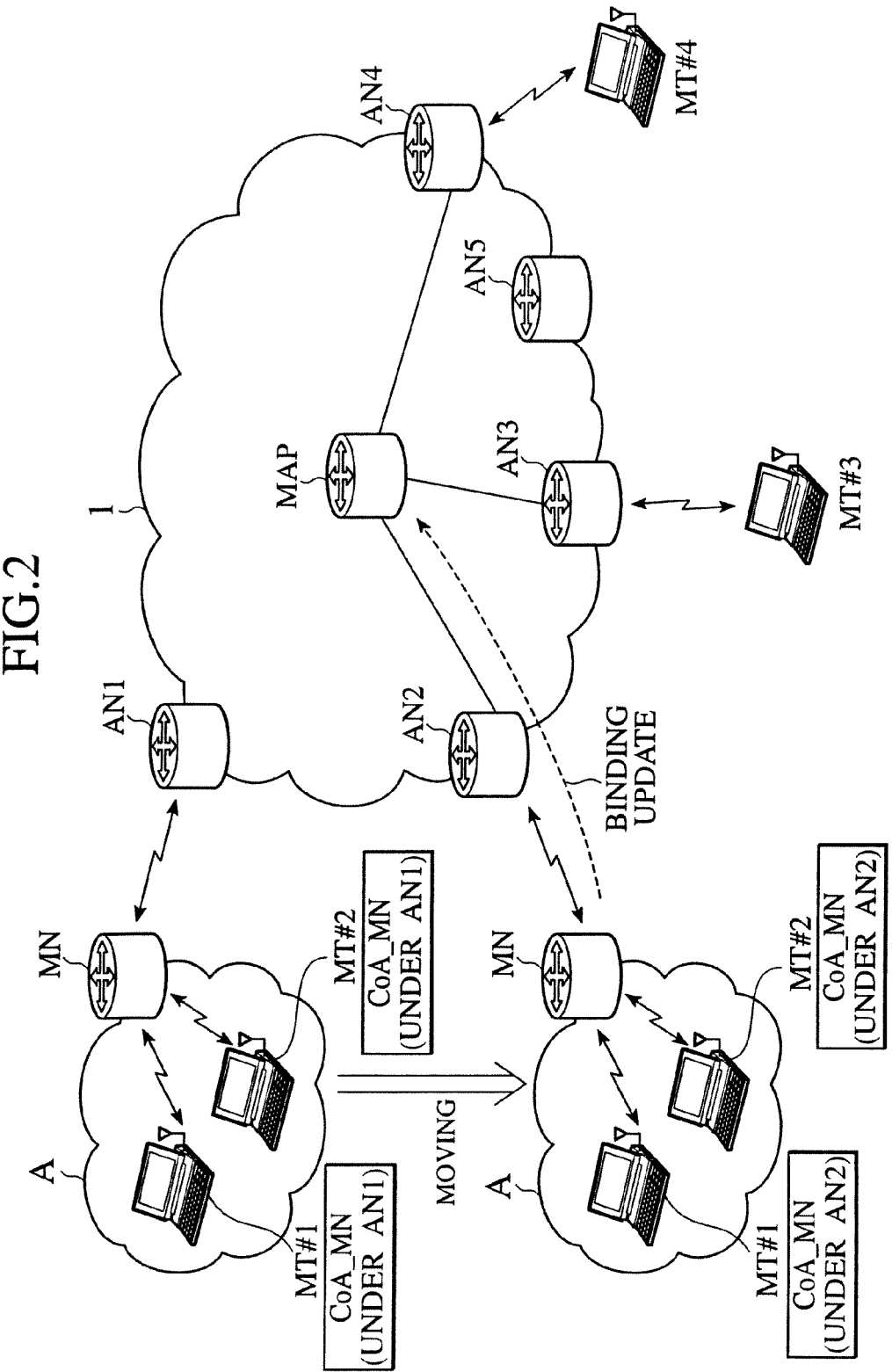
FIG. 2 is an entire block diagram of a mobile communications system according to a conventional art.
Figure 3:
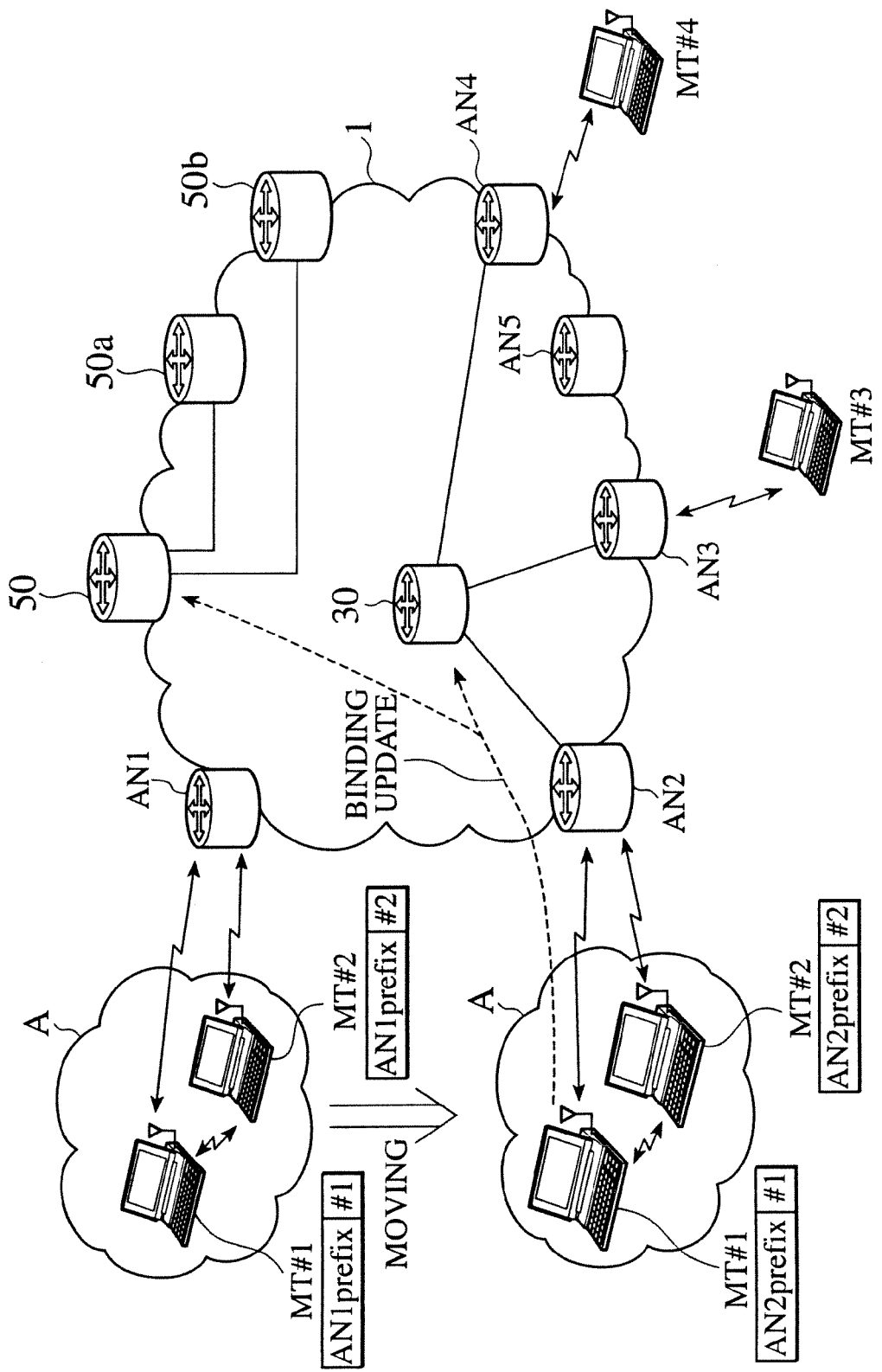
FIG. 3 is an entire block diagram of a mobile communications system according to a first embodiment of the present invention.

As shown in FIG. 3, the mobile communications system of this embodiment has a plurality of access nodes AN 1 to AN 5, a mobility management router 30, and mobility management servers 50, 50a and 50b, within a core network 1.

In the example of FIG. 3, a moving network A comprised of a plurality of mobile terminals including MT #1 and MT #2 is moving from a state of connection with the access node AN 1 into a state of connection with the access node AN 2.

In the mobile communications system of this embodiment, as shown in FIG. 3, packets are transferred to the mobile terminals (mobile communications terminals) MT #1 and MT #2 located in the moving network A connected to a given node (the access node AN 1 or AN 2) within the core network 1, based on address information of the mobile terminals (mobile communications terminals) MT #1 and MT #2.

As shown in FIG. 3, mobile terminal address information ofcludes common information and individual information.

The common information is related to a given node (the access node AN 1 or AN 2) to which the moving network A is connected.

The individual information is unrelated to the given node (the access node AN 1 or AN 2) to which the moving network A is connected. The individual information is unchanged when the connection to the given node (the access node AN 1 or AN 2) to which the moving network is connected is changed to another node (the access node AN 1 or AN 2).

More specifically, when the moving network A is connected to the access node AN 1, the mobile terminal MT #1 address information is "AN1prefix (common information)+#1 (individual information)". When the moving network A is connected to the access node AN 2, the mobile terminal MT #1 address information is "AN2prefix (common information)+#1 (individual information)".

Likewise, when the moving network A is connected to the access node AN 1, the mobile terminal MT #2 address information is "AN1prefix (common information)+#2 (individual information)". When the moving network A is connected to the access node AN 2, the mobile terminal MT #2 address information is "AN2prefix (common information)+#2 (individual information)".

As described above, the common information (AN1prefix or AN2prefix) is changed, depending on whether the moving network A is connected to the access node AN 1 or the access node AN 2.

As shown in FIG. 3, packets transmitted from the mobile terminal MT #3 or MT #4 are transferred via the mobility management router 30 to the mobile terminal MT #1 or MT #2 located in the moving network A.

Here, the mobility management router 30 is provided on a packet transfer path formed not to have a redundancy like a packet transfer path including a fixed-location home agent.

When detecting the movement of the moving network A, the mobile terminal MT #1 located in the moving network A notifies, on behalf of all the mobile terminals MTs located in the moving network A, the mobility management router 30 and the mobility management server 50, of an update information (a binding update) on the address information of all the mobile terminals MTs located in the moving network A.

Now, with reference to FIG. 4, the configuration of the mobile terminal MT #1 located in the moving network A will be described.

Figure 4:
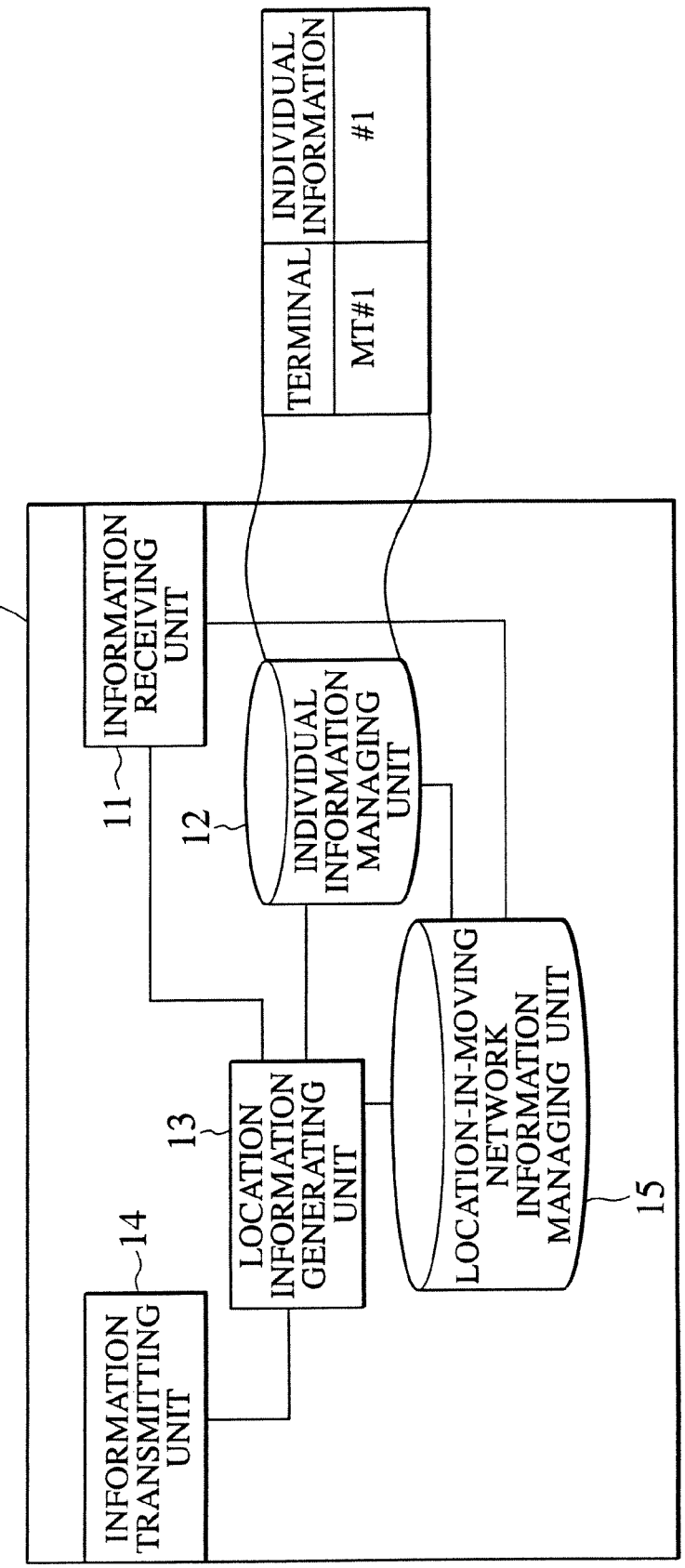
FIG. 4 is a functional block diagram of a mobile terminal in the mobile communications system according to the first embodiment of the present invention.

As shown in FIG. 4, the mobile terminal MT #1 has an information receiving unit 11, a individual information managing unit 12, a location information generating unit 13, an information transmitting unit 14, and a location-in-moving network information managing unit 15.

The information receiving unit 11 receives an advertisement (broadcast information) transmitted from the access node AN 1 or AN 2 and a binding update (update information) transmitted from another mobile terminal such as MT #2.

The individual information managing unit 12 manages the individual information on the mobile terminal MT #1. In the example shown in FIG. 4, the individual information managing unit 12 manages individual information "#1" on the mobile terminal MT #1. The individual information is unchanged when a connecting access node of the moving network A is changed from the access node AN 1 to the access node AN 2.

At the beginning of existing in the moving network A, the location information generating unit 13 generates location information (address information) on the mobile terminal MT #1, based on common information included in the advertisement received from the access node AN 1 or AN 2 and the individual information managed by the individual information managing unit 12.

The information transmitting unit 14 transmits the location information generated by the location information generating unit 13, to the mobility management router 30 and the mobility management servers 50, 50a and 50b.

An information transmitting unit 14 of any other mobile terminal MT than the mobile terminal MT #1 transmits location information generated by a location information generating unit 13 of the mobile terminal MT, to the mobile terminal MT #1 located in the moving network A, the mobility management router 30, and the mobility management servers 50, 50a and 50b.

The information transmitting unit 14 transmits an advertisement showing a change of the mobile terminal MT #1 location information (address information), to all the mobile terminals MTs located in the moving network A. The advertisement includes changed common information, for example.

The information transmitting unit 14 also transmits a binding update showing a change of the mobile terminal MT #1 location information (address information), to the mobility management router 30 and the mobility management servers 50, 50a and 50b. The binding update includes changed common information, for example.

The location-in-moving network information managing unit 15 manages location information (address information) on all the mobile terminals MTs located in the moving network A.

Specifically, the location-in-moving network information managing unit 15 constitutes an address information manager configured to manage the location information (address information) on the mobile terminals MTs located in the moving network A.

When detecting that the connection to an access node AN (given node) to which the moving network A is connected is changed to another access node, the location-in-moving network information managing unit 15 changes the mobile terminal MT location information (address information) by changing only the common information.

Now, with reference to FIG. 5, the configuration of the mobility management router 30 will be described.

Figure 5:
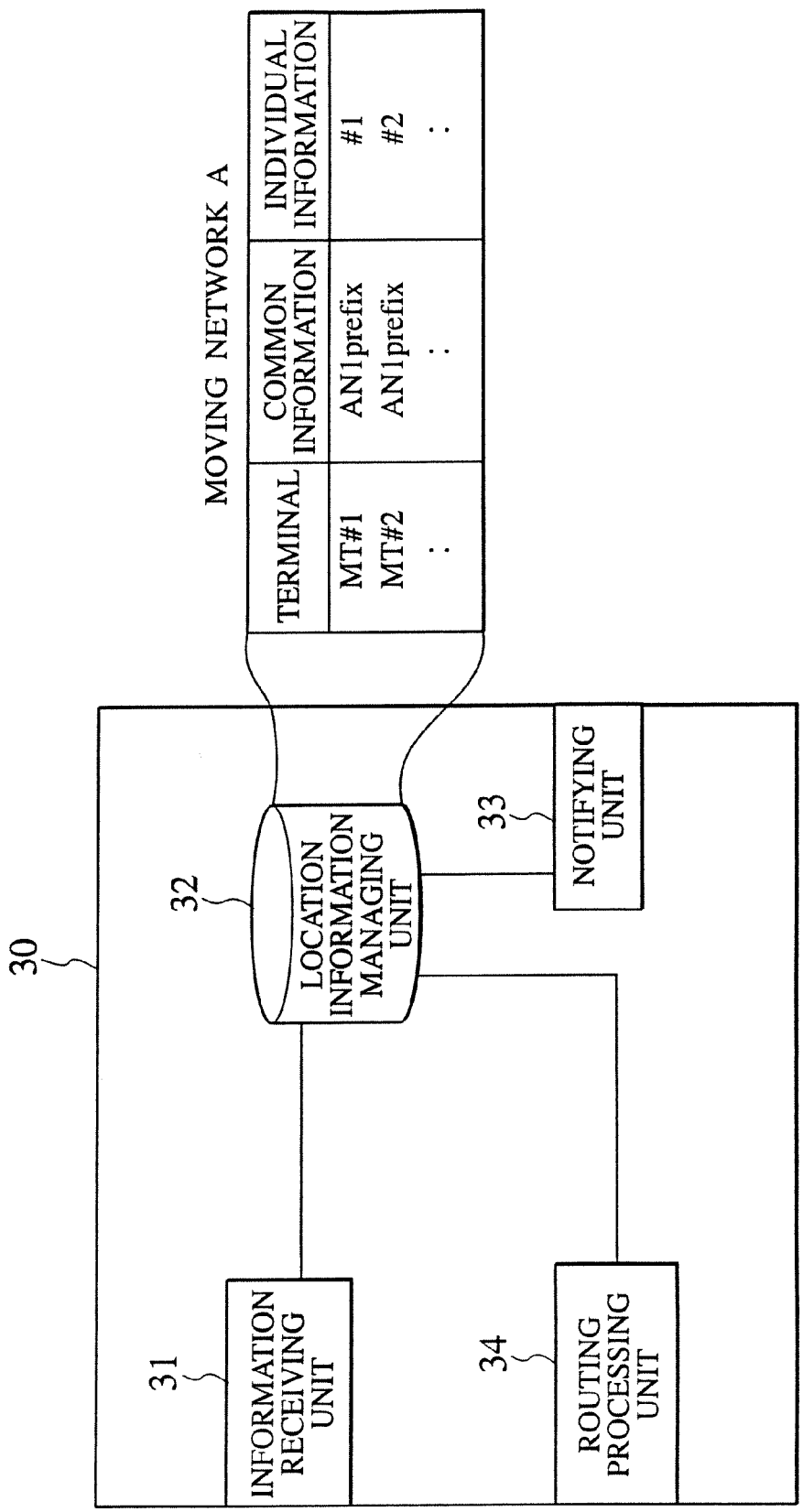
FIG. 5 is a functional block diagram of a mobility management router in the mobile communications system according to the first embodiment of the present invention.

As shown in FIG. 5, the mobility management router 30 has an information receiving unit 31, a location information managing unit 32, a notifying unit 33, and a routing processing unit 34.

The mobility management router 30 is a transfer device provided on a transfer path of packets to be transferred to the mobile terminal MTs located in the moving network A.

The information receiving unit 31 receives various information including location information transmitted from a mobile terminal MT which begins to exist in the moving network A, and a binding update transmitted from the mobile terminal MT #1.

The location information managing unit 32 manages location information of all the mobile terminals MTs located in the moving network A.

In the example of FIG. 5, the location information managing unit 32 manages mobile terminal MT #1 location information including "common information=AN1prefix" and "individual information=#1", mobile terminal MT #2 location information including "common information=AN1prefix" and "individual information=#2", and so on.

The location information managing unit 32 changes the common information of the mobile terminal MT location information it manages, according to a binding update from the mobile terminal MT #1, thereby changing the mobile terminal MT location information.

When a mobile terminal MT is newly located in the moving network A, the notifying unit 33 notifies a correspondent node (e.g., the mobile terminal MT #3 or MT #4) communicating with the mobile terminal MT of the fact.

The routing processing unit 34 refers to the location information managing unit 32, so as to transfer packets to a mobile terminal MT located in the moving network A.

In the example of FIG. 3, the routing processing unit 34 transfers packets transmitted from the mobile terminal MT #3 via the access node AN 3, to the mobile terminal MT #1 via the access node AN 1. The routing processing unit 34 also transfers packets transmitted from the mobile terminal MT #4 via the access node AN 4, to the mobile terminal MT #2 via the access node AN 1.

The function of the mobility management router 30 may be provided to the access nodes AN 1 to AN 4, the mobile terminals MT #3 and MT #4 as the correspondent nodes and the like.

Figure 6:
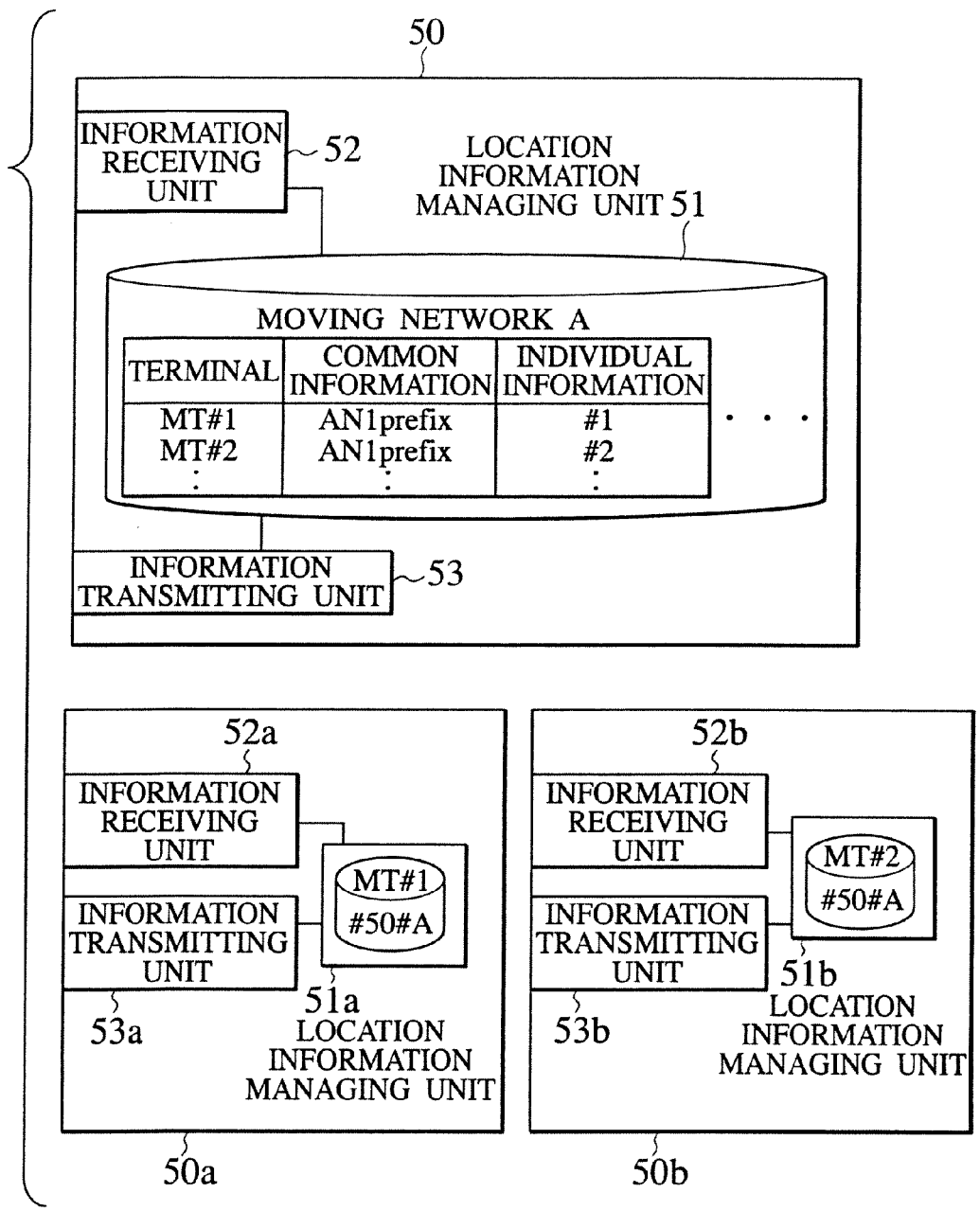
FIG. 6 is a functional block diagram of a mobility management server in the mobile communications system according to the first embodiment of the present invention.

Now, with reference to FIG. 6, the configurations of the mobility management servers 50, 50a and 50b will be described. As shown in FIG. 6, the configurations of the mobility management servers 50, 50a and 50b are basically the same, except for the details of management by a location information managing unit 51. Thus, the function of the mobility management server 50 will be hereinafter representatively described.

As shown in FIG. 6, the mobility management server 50 has a location information managing unit 51, an information receiving unit 52, and an information transmitting unit 53. The mobility management server 50 is an MIP home agent, for example.

The location information managing unit 51 manages location information of all the mobile terminal MTs located in the moving network A.

In the example of FIG. 6, the location information managing unit 51 manages mobile terminal MT #1 location information including "common information=AN1prefix" and "individual information=#1", mobile terminal MT #2 location information including "common information=AN1prefix" and "individual information=#2", and so on.

The location information managing unit 51 changes the common information of the mobile terminal MT location information it manages, according to a binding update from the mobile terminal MT #1, thereby changing the mobile terminal MT location information.

To reduce access during location information change, location information managing units 51a and 51b of the mobility management servers 50a and 50b are provided with pointers to the location information managing unit 51 of the mobility management server 50.

More specifically, as shown in FIG. 6, the location information managing unit 51a of the mobility management server 50a stores the fact that the mobile terminal MT #1 location information is listed in a table for the moving network A within the location information managing unit 51 of the mobility management server 50 (pointer information).

The location information managing unit 51b of the mobility management server 50b stores the fact that the mobile terminal MT #2 location information is listed in the table for the moving network A within the location information managing unit 51 of the mobility management server 50 (pointer information).

Details of the mobile terminal MT #1 location information are stored in the location information managing unit 51 of the mobility management server 50.

During a handoff process of the mobile terminal MT #1 or MT #2, the location information managing unit 51 of the mobility management server 50 performs a rewrite of the information, while the location information managing units 51a and 51b of the mobility management servers 50a and 50b do not perform a rewrite of the information.

The information receiving unit 52 receives various information including location information transmitted from a mobile terminal MT which begins to exist in the moving network A, and a binding update transmitted from the mobile terminal MT #1. The information transmitting unit 53 transmits various information.

Operation of the Mobile Communications System in the Embodiment

The operation of the mobile communications system according to this embodiment will be described with reference to FIGS. 7 and 8.

First, with reference to FIG. 7, description will be made on an operation of assigning address information (location information), that is, a registration operation of the mobile terminal MT #2, when the mobile terminal MT #2 is newly located in the moving network A, in the mobile communications system of this embodiment.

Figure 7:
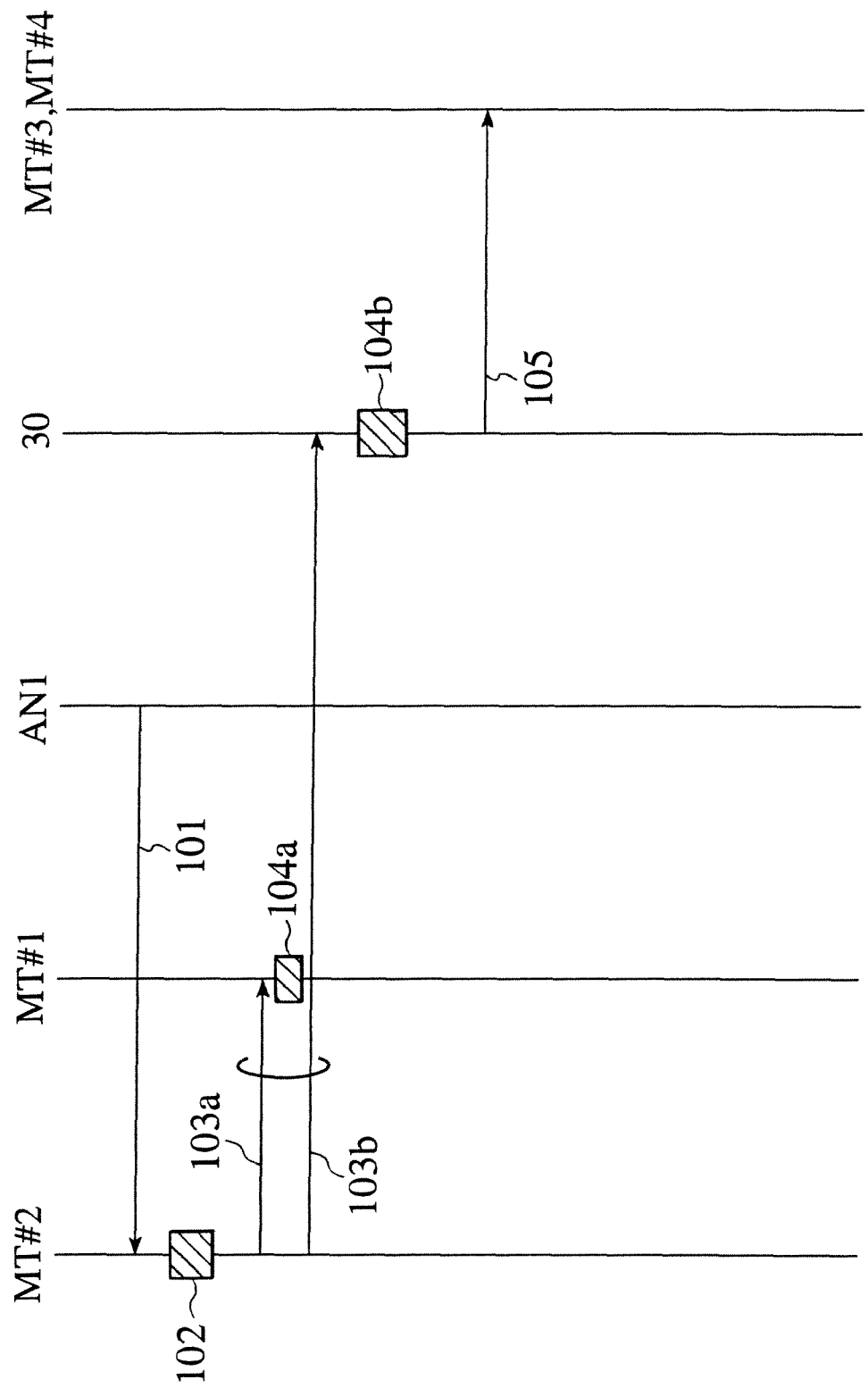
FIG. 7 is a sequence diagram illustrating a registration operation of a mobile terminal in the mobile communications system according to the first embodiment of the present invention.

As shown in FIG. 7, in step 101, the access node AN 1 transmits an advertisement including common information (AN1prefix) related to the access node AN 1.

In step 102, the location information generating unit 13 of the mobile terminal MT #2 which has begun to exist in the moving network A generates location information ("AN1prefix"+"#2"), using the common information included in the advertisement received from the access node AN 1 and the individual information (#2) managed by the individual information managing unit 12.

The information transmitting unit 14 of the mobile terminal MT #2 transmits a binding update including the generated location information to the mobile terminal MT #1, in step 103a, and transmits the generated location information to the mobility management router 30, in step 103b.

In step 104a, the location-in-moving network information managing unit 15 of the mobile terminal MT #1 stores the mobile terminal MT #2 location information.

In step 104b, the location information managing unit 32 of the mobility management router 30 stores the mobile terminal MT #2 location information.

From the common information of the mobile terminal MT #2 location information, it can be determined that the mobile terminal MT #2 is located in the moving network A connected to the access node AN 1.

In step 105, the notifying unit 33 of the mobility management router 30 gives a notification to the mobile terminals MT #3 and MT #4, so as to instruct them to transmit packets to the mobility management router 30 for communication with the mobile terminal MT #2 located in the moving network A.

Second, with reference to FIG. 8, description will be made on an operation of changing address information (location information) when the moving network A moves in the mobile communications system of this embodiment.

Figure 8:
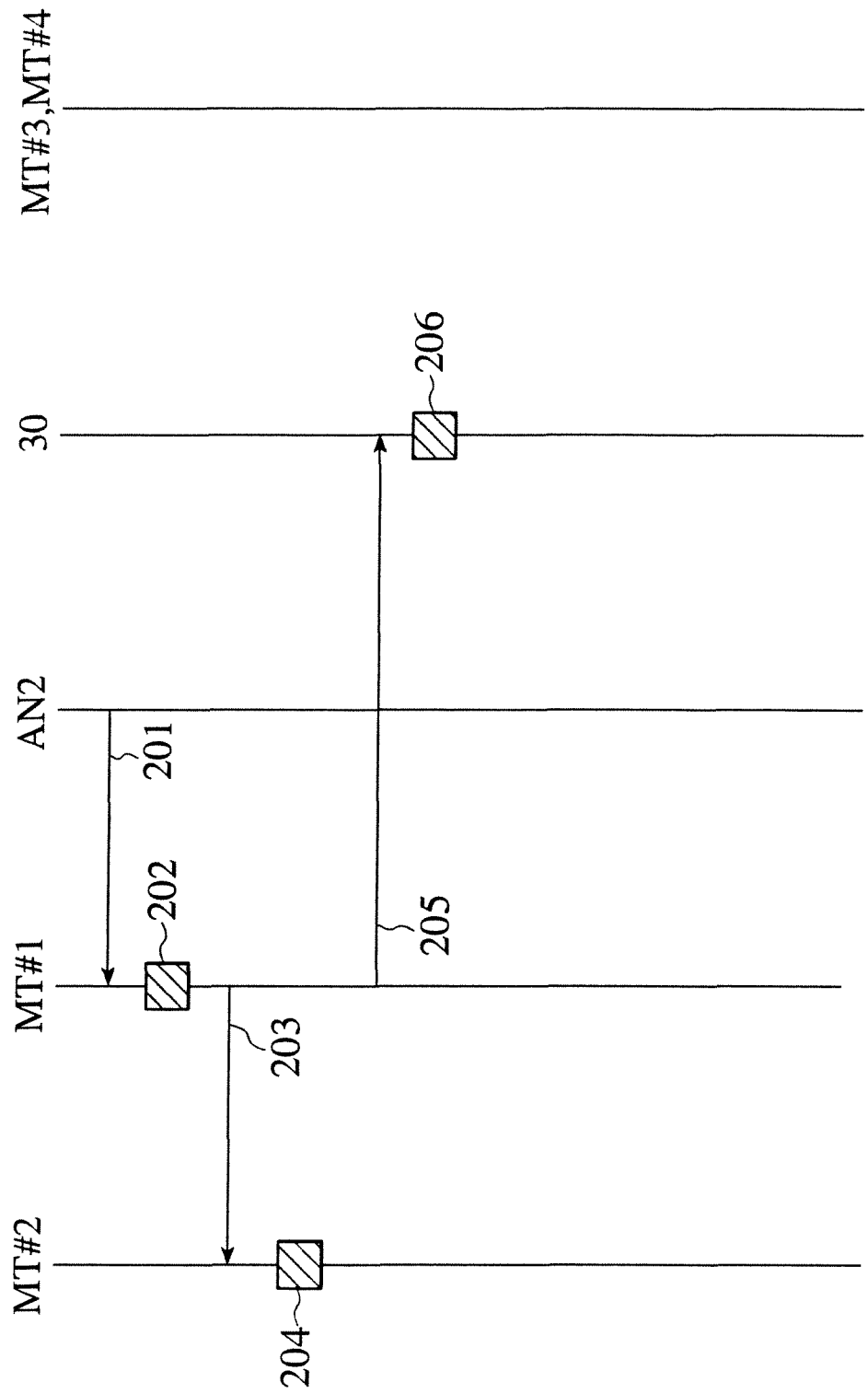
FIG. 8 is a sequence diagram illustrating an operation of changing mobile terminal address information of the mobile communications system according to the first embodiment of the present invention.

As shown in FIG. 8, in step 201, the destination access node AN 2 transmits an advertisement including common information (AN2prefix) related to the access node AN 2.

In step 202, the location-in-moving network information managing unit 15 of the mobile terminal MT #1 changes the common information (AN1prefix) of the location information of the mobile terminals MTs located in the moving network A, to the common information (AN2prefix) included in the advertisement received from the access node AN 2.

In step 203, the information transmitting unit 14 of the mobile terminal MT #1 transmits an advertisement including the changed common information (AN2prefix), to all the mobile terminals MTs located in the moving network A.

In step 204, the location-in-moving network information managing unit 15 of the mobile terminal MT #2 changes the common information (AN1prefix) of the mobile terminal MT #2 location information, to the common information (AN2prefix) included in the advertisement received from the mobile terminal MT #1.

At that time, the information transmitting unit 14 of the mobile terminal MT #2 does not transmit a binding update on the location information, to the mobility management router 30 and the like.

In step 205, the information transmitting unit 14 of the mobile terminal MT #1 transmits a fact that the moving network A has moved, that is, a binding update for advertising the change of the location information of the mobile terminal MTs located in the moving network A, to the mobility management router 30 (and the mobility management server 50).

In step 206, the location information managing unit 32 of the mobility management router 30 changes the common information (AN1prefix) of the location information of the mobile terminal MTs located in the moving network A, to the common information (AN2prefix) included in the binding update received from the mobile terminal MT #1. As a result, the handoff process of the mobile terminal MTs located in the moving network A is completed.

Function/Effect of the Mobile Communications System in the Embodiment

According to the mobile communications system in this embodiment, when the moving network A moves, only common information of location information of the mobile terminals MTs located in the moving network A related to an access node AN to which the moving network A is connected is changed, resulting in a reduced processing time during handoff.

Further, according to the mobile communications system in the embodiment, only the mobile terminal MT #1 (a given mobile communications terminal) located in the moving network A notifies the mobility management router 30 and the mobility management server 50, of the movement of the moving network A, resulting in a reduced amount of signals during handoff process. Specifically, only a signal showing a change of common information is sent, leading to a reduced amount of signals during handoff.

Mobile Communications System in a Second Embodiment of the Invention

Figure 9:
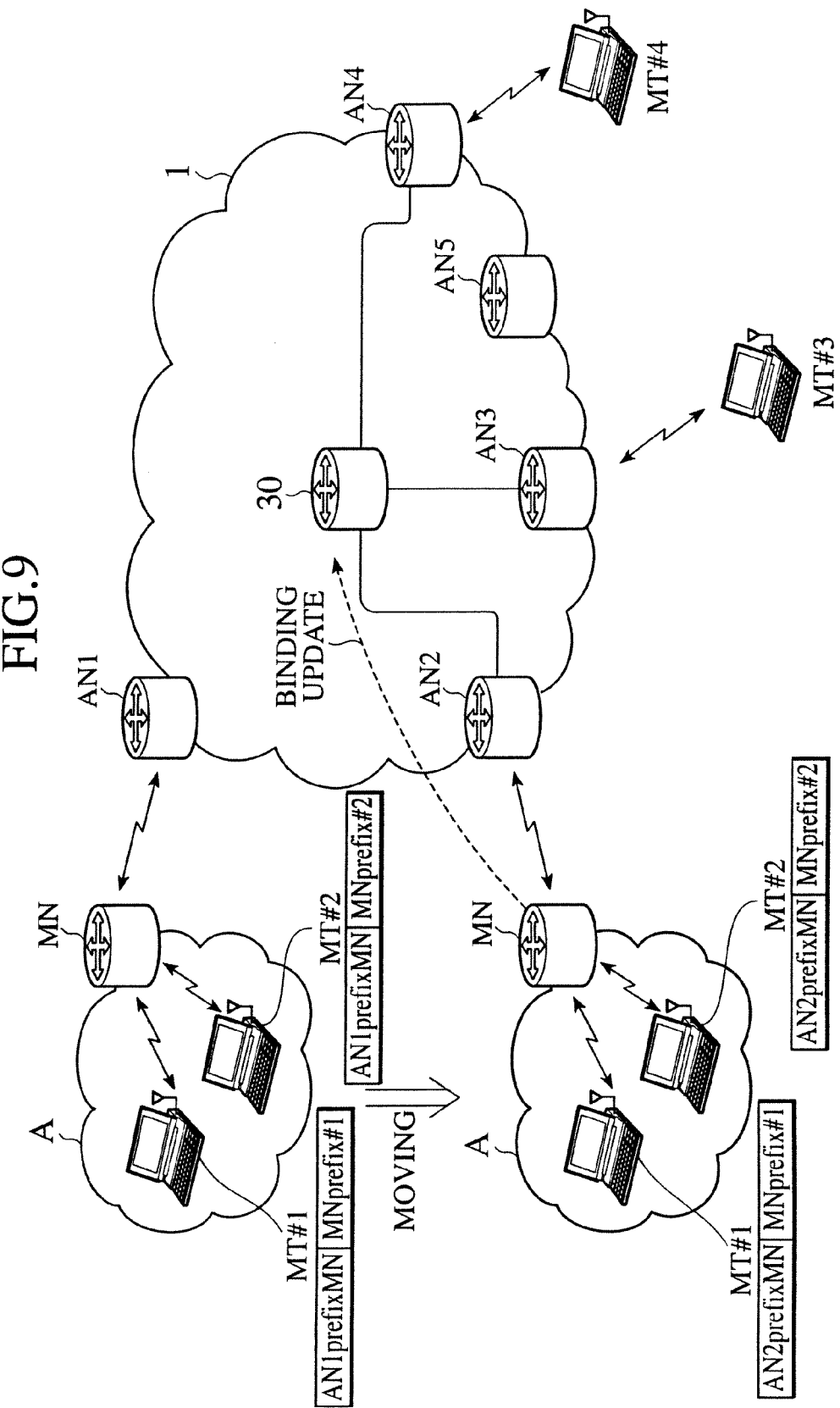
FIG. 9 is an entire block diagram of a mobile communications system according to a second embodiment of the present invention.
Figure 10:
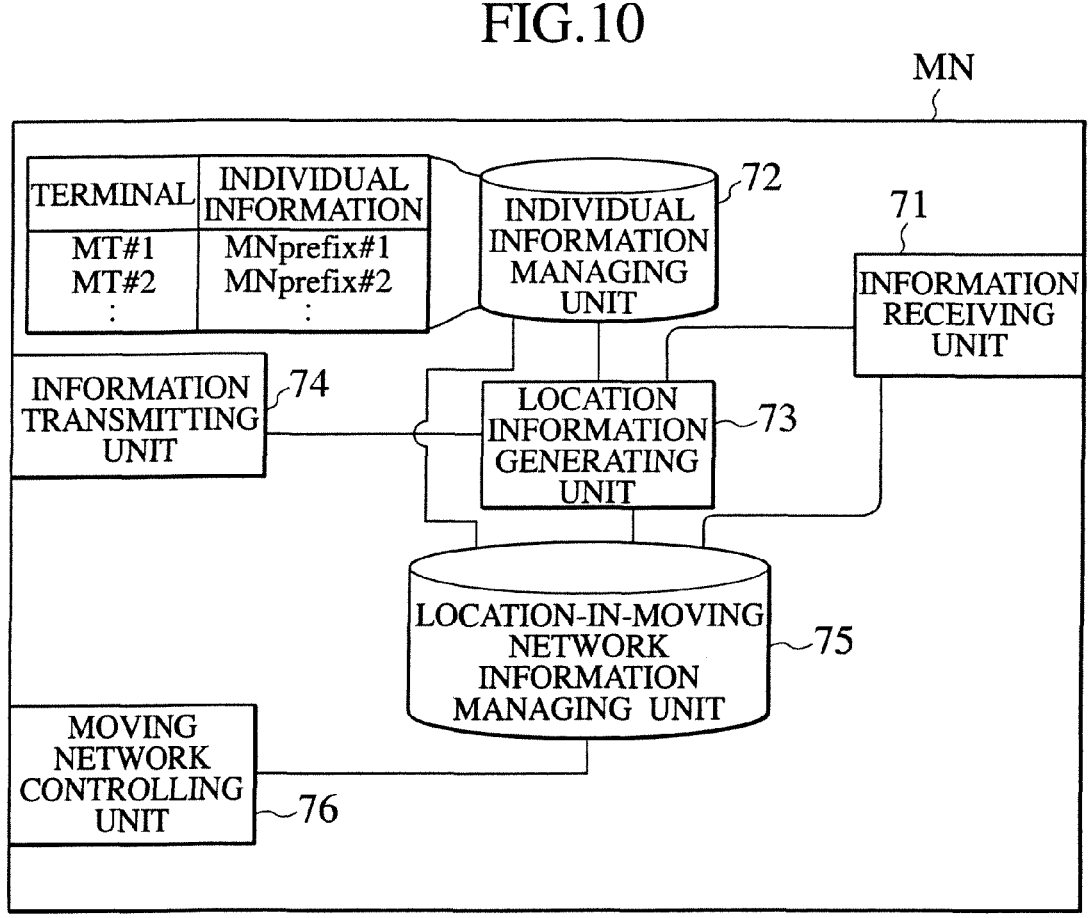
FIG. 10 is a functional block diagram of a mobile node in the mobile communications system according to the second embodiment of the present invention.
Figure 11:
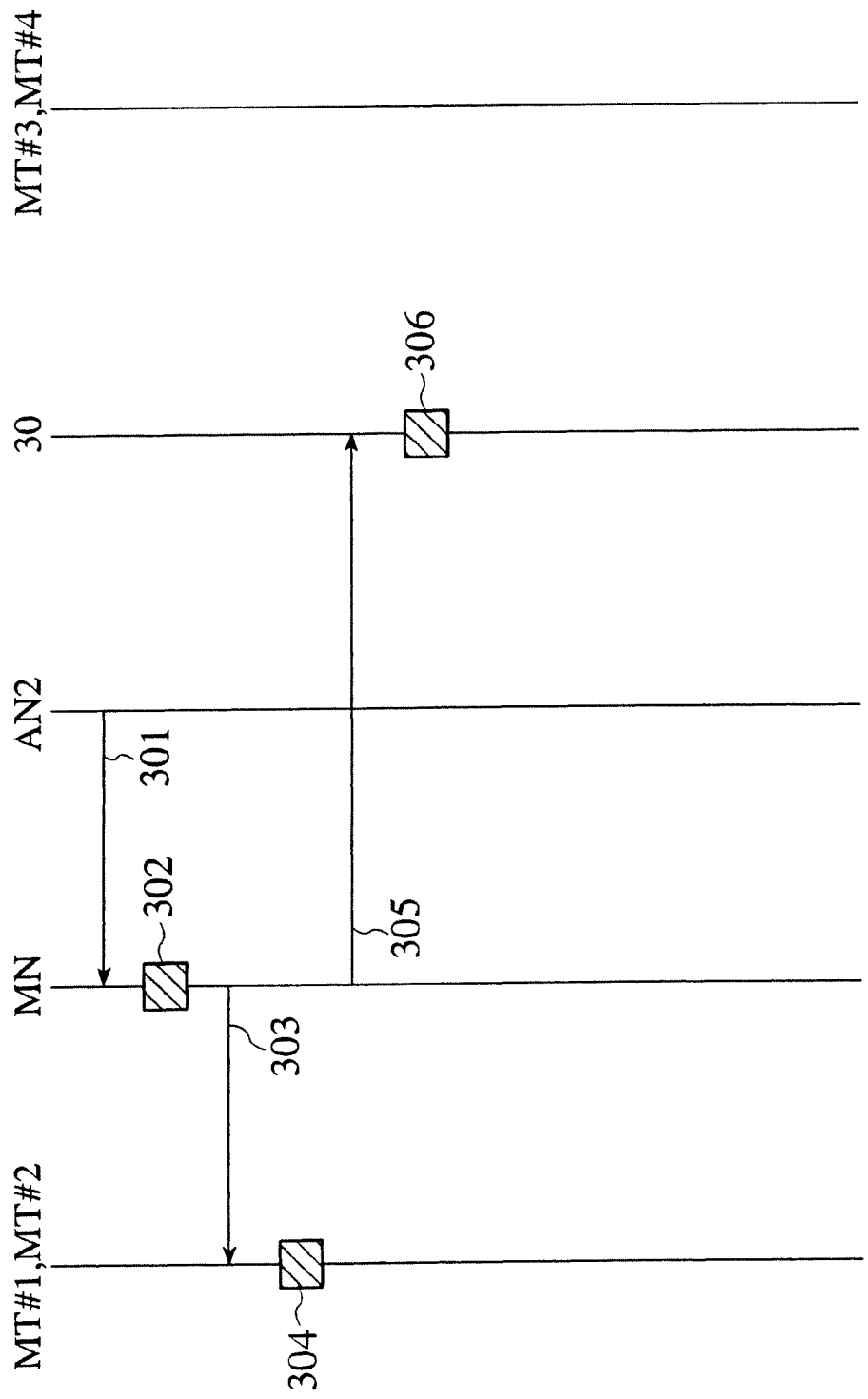
FIG. 11 is a sequence diagram illustrating an operation of changing mobile terminal address information of the mobile communications system according to the second embodiment of the present invention.

With reference to FIGS. 9 to 11, a mobile communications system according to a second embodiment of the present invention will be described. Hereinafter description will be made mainly on differences from the above-described mobile communications system according to the first embodiment.

As shown in FIG. 9, the mobile communications system of this embodiment is different from the mobile communications system according to the first embodiment in that it includes a mobile node MN for managing a moving network A, and in the configuration of mobile terminal MT location information.

As shown in FIG. 10, the mobile node MN has an information receiving unit 71, a individual information managing unit 72, a location information generating unit 73, an information transmitting unit 74, a location-in-moving network information managing unit 75, and a moving network controlling unit 76.

The moving network controlling unit 76 serves as an interface between a mobile terminal MT located in the moving network A and an access node AN, cooperating with the location-in-moving network information managing unit 75.

The other functions of the mobile node MN are identical to those of the mobile terminal MT #1 shown in FIG. 4, and will not be described.

In this embodiment, the common information is mobile node MN address information (location information) including information showing a connecting access node AN.

The individual information is mobile terminal MT address information (location information) including information showing the mobile node MN which manages the moving network A where the mobile terminal MT is located.

More specifically, when the moving network A is connected to an access node AN 1, mobile terminal MT #1 address information is "AN1prefixMN (common information)+MNprefix#1 (individual information)".

When the moving network A is connected to an access node AN 2, the mobile terminal MT #1 address information is "AN2prefixMN (common information)+MNprefix#1 (individual information)".

Likewise, when the moving network A is connected to the access node AN 1, mobile terminal MT #2 address information is "AN1prefixMN (common information)+MNprefix#2 (individual information)".

When the moving network A is connected to the access node AN 2, the mobile terminal MT #2 address information is "AN2prefixMN (common information)+MNprefix#2 (individual information)."

Now, with reference to FIG. 11, description will be made on an operation of changing address information (location information) when the moving network A moves in the mobile communications system in this embodiment.

As shown in FIG. 11, in step 301, the destination access node AN 2 transmits an advertisement including common information (AN2prefixMN) related to the access node AN 2.

In step 302, the location-in-moving network information managing unit 75 of the mobile node MN changes the common information (AN1prefixMN) of the location information of the mobile terminal MTs located in the moving network A, to the common information (AN2prefixMN) included in the advertisement received from the access node AN 2.

In step 303, the information transmitting unit 74 of the mobile node MN transmits an advertisement including the changed common information (AN2prefixMN), to all the mobile terminals MTs located in the moving network A.

In step 304, location-in-moving network information managing units 15 of the mobile terminals MT #1 and MT #2 change the common information (AN1prefixMN) of the location information of the mobile terminals MT #1 and MT#2, to the common information (AN2prefixMN) included in the advertisement received from the mobile node MN.

At that time, information transmitting units 14 of the mobile terminals MT #1 and MT #2 do not transmit a binding update on the location information to a mobility management router 30 and the like.

In step 305, the information transmitting unit 74 of the mobile node MN transmits a binding update for advertising that the moving network A has moved, that is, the change of the location information of the mobile terminals MTs located in the moving network A, to the mobility management router 30 (and a mobility management server 50).

In step 306, a location information managing unit 32 of the mobility management router 30 changes common information (AN1prefixMN) of location information of the mobile terminals MTs located in the moving network A, to the common information (AN2prefixMN) included in the binding update received from the mobile node MN. As a result, the handoff process of the mobile terminals MTs located in the moving network A is completed.

According to the mobile communications system in this embodiment, when the moving network A moves, only common information related to an access node AN to which the moving network A is connected, of location information of the mobile terminals MTs located in the moving network A is changed, resulting in a reduced processing time during handoff process.

Further, according to the mobile communications system in this embodiment, only the mobile node MN located in the moving network A notifies the mobility management router 30 and the mobility management server 50, of the movement of the moving network A, resulting in a reduced amount of signals during handoff process. Specifically, only a signal showing a change of common information is sent, leading to a reduced amount of signals during handoff process.

Mobile Communications System in a Third Embodiment of the Invention

Figure 12:
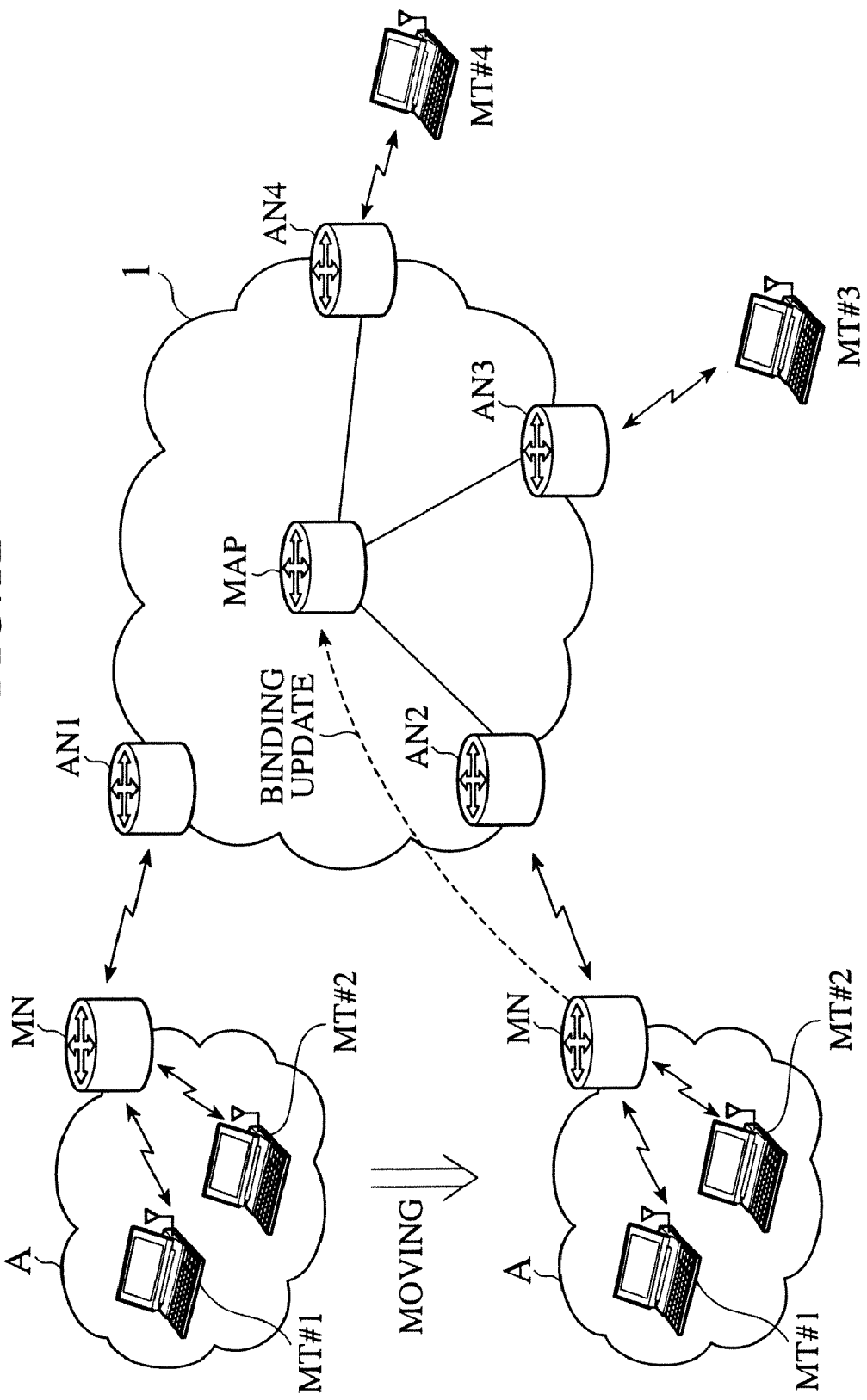
FIG. 12 is an entire block diagram of a mobile communications system according to a third embodiment of the present invention.

With reference to FIGS. 12 and 13, a mobile communications system according to a third embodiment of the present invention will be described. The mobile communications system in this embodiment is the result of application of the above-described mobile communications system in the second embodiment to a conventional HMIP mobile communications system.

Hereinafter description will be made mainly on differences from the mobile communications system in the second embodiment.

As shown in FIG. 12, the mobile communications system in this embodiment is different from the mobile communications system in the second embodiment, in the configuration of mobile terminal MT location information.

Specifically, when a moving network A is connected to an access node AN 1, mobile terminal MT #1 routing information (location information) is "CoA_MN (under AN 1)" (first routing information) in a MAP (see FIG. 13A), and is "CoA_MT1" (second routing information) in a mobile node MN (see FIG. 13B).

When the moving network A is connected to an access node AN 2, the mobile terminal MT #1 routing information (location information) is "CoA_MN (under AN 2)" (first routing information) in the MAP, and is "CoA_MT1" (second routing information) in the mobile node MN.

Also, when the moving network A is connected to the access node AN 1, mobile terminal MT #2 routing information (location information) is "CoA_MN (under AN 1)" (first routing information) in the MAP (see FIG. 13A), and is "CoA_MT2" (second routing information) in the mobile node MN (see FIG. 13B).

When the moving network A is connected to the access node AN 2, the mobile terminal MT #2 routing information (location information) is "CoA_MN (under AN 2)" (first routing information) in the MAP, and is "CoA_MT2" (second routing information) in the mobile node MN.

Specifically, as shown in FIG. 13A, the mobile node MN address information (care-of-address) is used as the first mobile terminal MT routing information.

As shown in FIG. 13B, the mobile terminal MT address information (care-of-addresses) is used as the second mobile terminal MT routing information.

When detecting the movement of the moving network A, an information transmitting unit 74 of the mobile node MN transmits a binding update showing the fact to the MAP.

As a result, a location information managing unit 32 of the MAP changes the routing information on the mobile terminals MTs located in the moving network A.

In this embodiment, the above described "CoA_MN" is the common information in the moving network A. Therefore, the address information of the mobile communications terminals can be changed, only by changing the common information ("CoA_MN"), when the handoff process is performed.

Mobile Communications System in a Fourth Embodiment of the Invention

Figure 14:
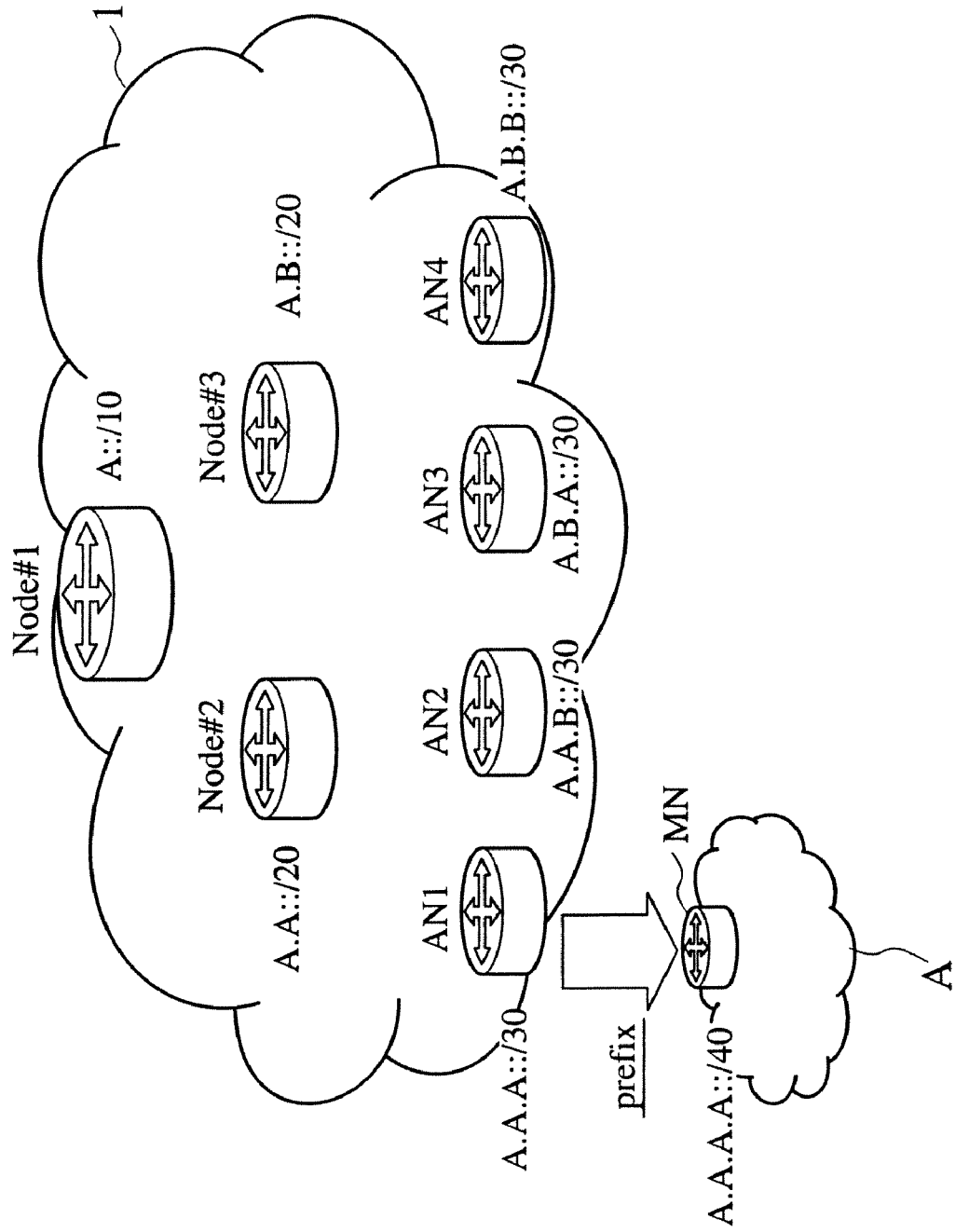
FIG. 14 is an entire block diagram of a mobile communications system according to a fourth embodiment of the present invention.

With reference to FIG. 14, a mobile communications system according to a fourth embodiment of the present invention will be described. The mobile communications system in this embodiment shows an exemplary method of assigning common information and individual information.

As shown in FIG. 12, the mobile communications system in this embodiment is comprised of a hierarchical structure including nodes Node #1 to Node #3, access nodes AN 1 to AN 4, and a mobile node MN.

As shown in FIG. 14, the Node #1 is assigned a subnetwork "A::/10", the Node #2 is assigned a subnetwork "A.A::/20", the Node #3 is assigned a subnetwork "A.B::/20", the access node AN 1 is assigned a subnetwork "A.A.A::/30", the access node AN 2 is assigned a subnetwork "A.A.B::/30", the access node AN 3 is assigned a subnetwork "A.B.A::/30", and the access node AN 4 is assigned a subnetwork "A.B.B::/30". Here, IP v6 notation is used for the indication of the subnetworks.

The mobile node MN connected to the access node AN 1 is assigned a portion (A.A.A.A::/40) of the subnetwork assigned to the access node AN 1 as common information by the access node AN 1.

Mobile Communications System in a Fifth Embodiment of the Invention

With reference to FIGS. 15 to 19, a mobile communications system according to a fifth embodiment of the present invention will be described. Hereinafter description will be made mainly on differences from the above-described mobile communications system according to the second embodiment.

Figure 15:
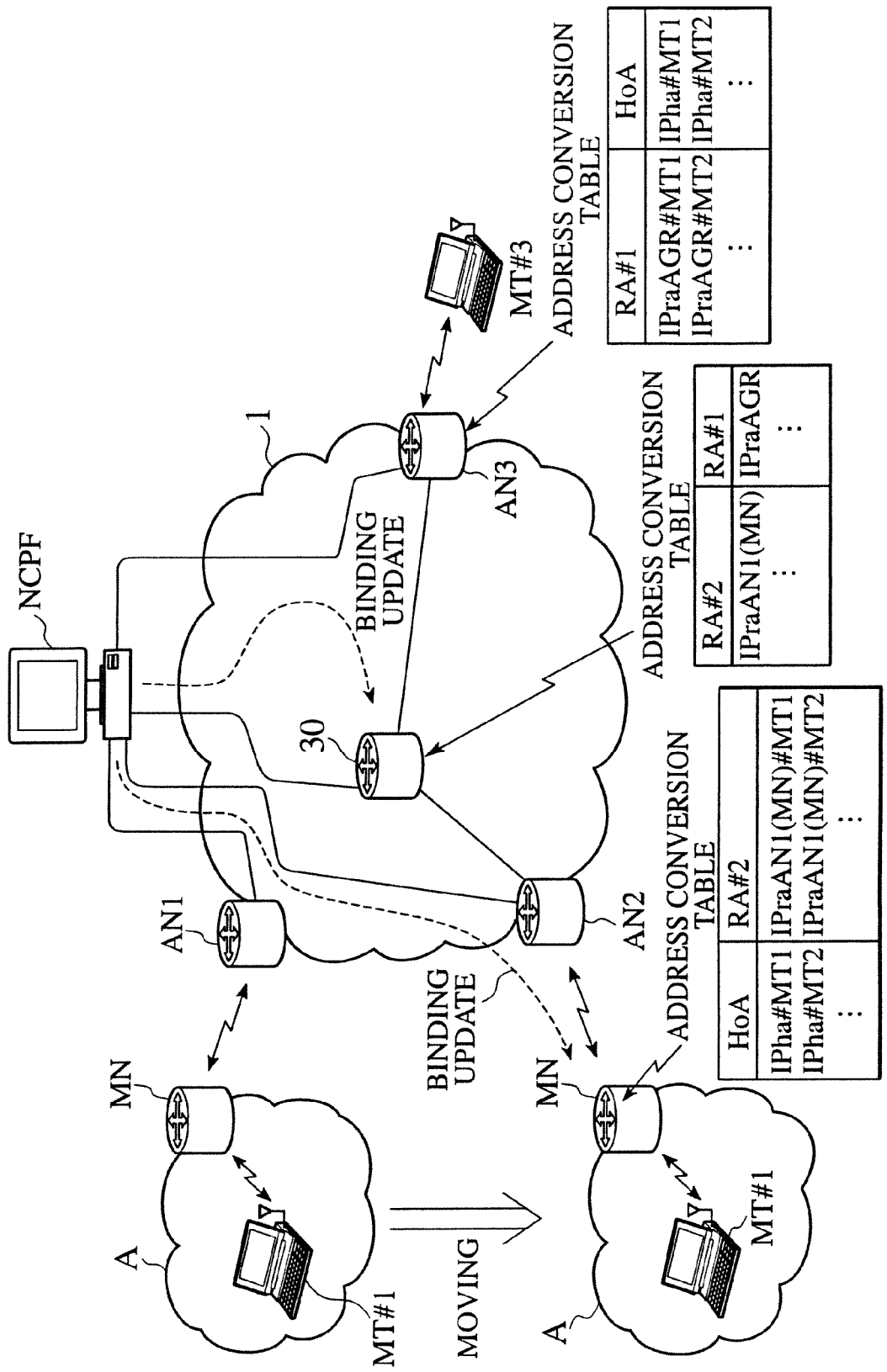
FIG. 15 is an entire block diagram of a mobile communications system according to a fifth embodiment of the present invention.

As shown in FIG. 15, the mobile communications system in this embodiment is different from the mobile communications system in the second embodiment in that it includes a network management server NCPF and in that address conversion is performed in a mobility management router (AGR) 30, an access node AN and a mobile node MN.

Use of this system allows individual information to be limited in use to a moving network, thus prevented from duplication, and reliably unchanged when the moving network moves.

Figure 16:
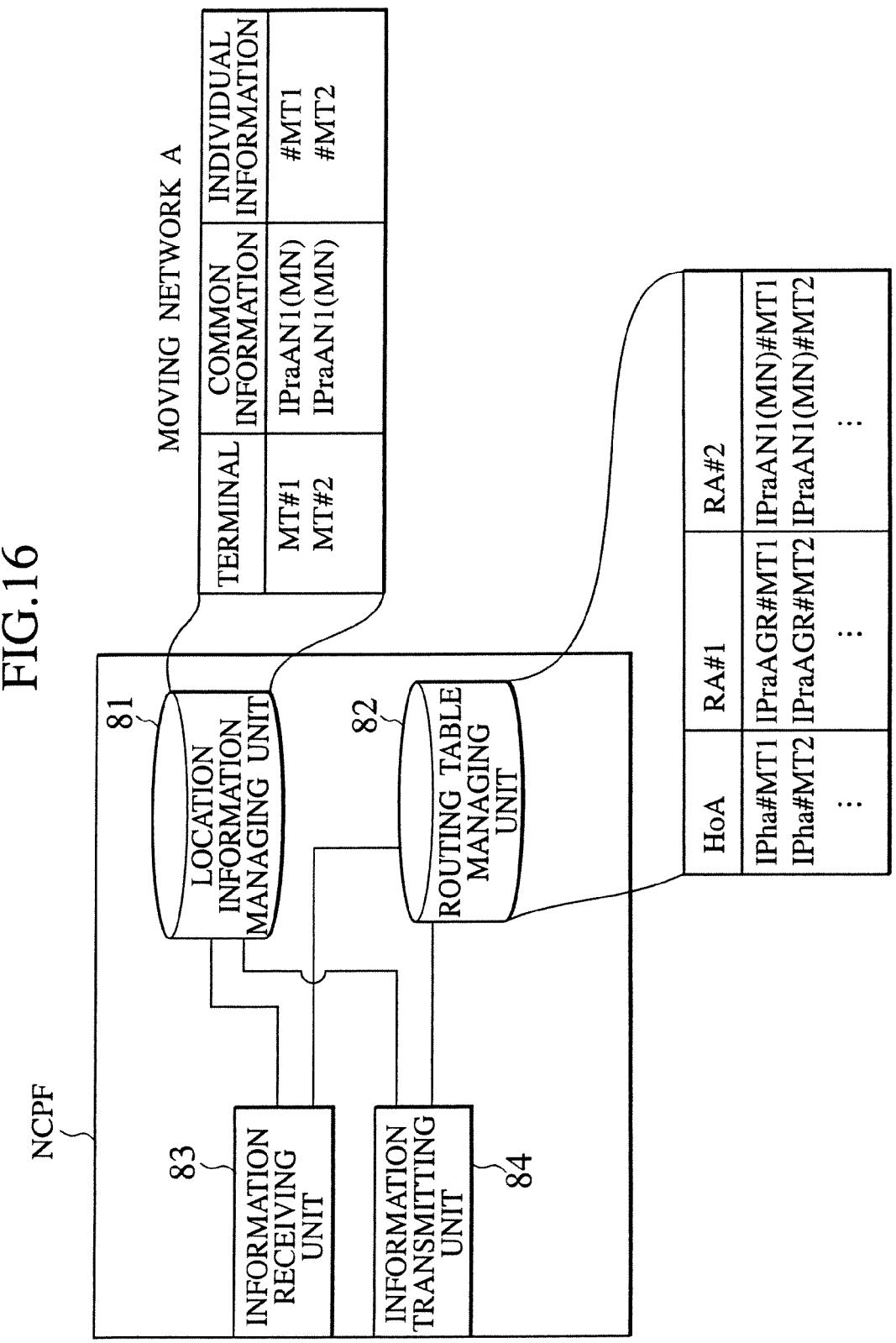
FIG. 16 is a functional block diagram of a network management server in the mobile communications system according to the fifth embodiment of the present invention.

With reference to FIG. 16, the configuration of the network management server NCPF will be described. As shown in FIG. 16, the network management server NCPF has a location information managing unit 81, a routing table managing unit 82, an information receiving unit 83, and an information transmitting unit 84.

The location information managing unit 81 manages location information of all mobile terminals MTs located in a moving network A.

In the example of FIG. 16, the location information managing unit 81 manages mobile terminal MT #1 location information including "common information=IPraAN1(MN)" and "individual information=#MT1", and mobile terminal MT #2 location information including "common information=IPraAN1 (MN)" and "individual information=#MT2", and so on.

The routing table managing unit 82 manages a routing table for performing address conversion in a core network 1 (that is, in the access nodes ANs and the mobility management router 30) and in a mobile node MN.

The information receiving unit 83 receives various information including a binding update from a mobile node MN. The information transmitting unit 84 transmits various information such as a binding update on address conversion tables, to a mobile node MN, the mobility management router (AGR) 30 and the access nodes ANs.

In the example of FIG. 15, an address conversion table of an access node AN 3 is for converting a home address HoA (IPha#MT1) of the mobile terminal MT #1 into first mobile terminal MT #1 location information RA#1 (IPraAGR#MT1).

An address conversion table of the mobility management router (AGR) 30 is for converting first common information (prefix: IPraAGR) of the first mobile terminal MT #1 location information RA#1 (IPraAGR#MT1) into second common information (prefix: IPraAN1 (MN)) of second mobile terminal MT #1 location information RA #2 (IPraAN1(MN) #MT1).

Here, the mobility management router (AGR) 30 uniformly converts the first common information "IPraAGR" included in received packets into the second common information "IPraAN1 (MN)".

During handoff process of the moving network A, the mobility management router (AGR) 30 only rewrites the second common information instead of rewriting individual location information of the mobile terminals MTs located in the moving network A, resulting in a significant reduction in processing time during handoff process.

An address conversion table of the mobile node MN is for converting the second mobile terminal MT #1 location information RA#2 (IPraAN1(MN)#MT1) into the home address HoA (IPha#MT1) of the mobile terminal MT #1.

Now, with reference to FIGS. 17 to 19, the operation of the mobile communications system according to this embodiment will be described.

First, with reference to FIG. 17, a registration operation of the mobile terminal MT #1 in the mobile communications system according to this embodiment will be described.

Figure 17:
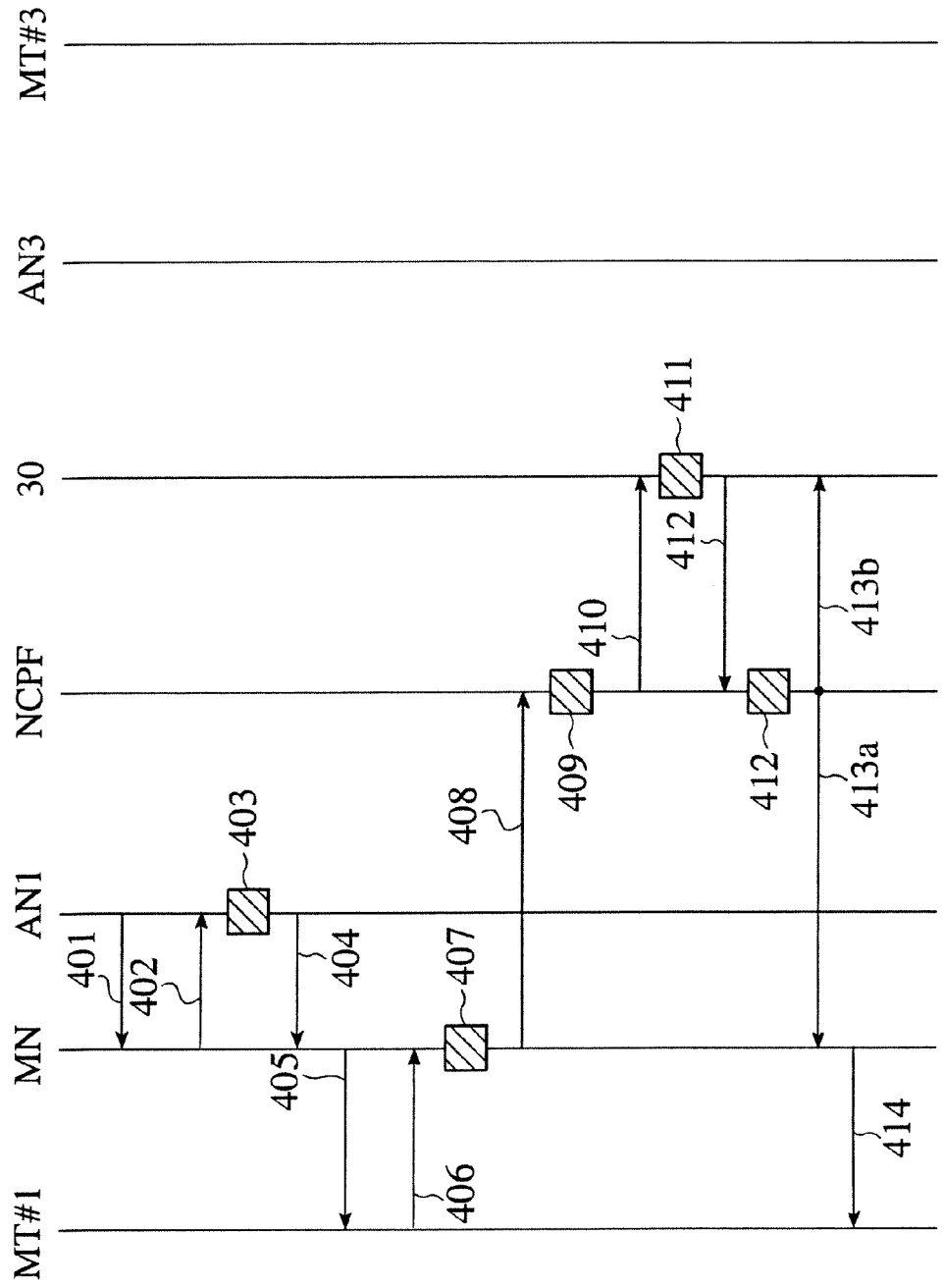
FIG. 17 is a sequence diagram illustrating a registration operation of a mobile terminal in the mobile communications system according to the fifth embodiment of the present invention.

As shown in FIG. 17, in step 401, an access node AN 1 transmits an advertisement to the mobile node MN.

In step 402, an information transmitting unit 74 of the mobile node MN transmits to the access node AN 1 an inquiry for common information (prefix) assignable to the mobile terminal MT #1 located in the moving network A.

In step 403, the access node AN 1 selects a prefix (common information) assignable to the mobile terminal MT #1, and in step 404, the access node AN 1 transmits a reply including the selected prefix (common information) to the mobile node MN.

In step 405, the information transmitting unit 74 of the mobile node MN transmits to the mobile terminal MT #1 an advertisement showing the fact that the mobile terminal MT #1 can be registered. In step 406, the mobile terminal MT #1 transmits a reply to the advertisement to the mobile node MN.

In step 407, a location information generating unit 73 of the mobile node MN generates mobile terminal MT #1 location information ("common information=IPraAN1 (MN)"+"individual information=#MT1") according to the prefix (common information), and stores the generated mobile terminal MT #1 location information in a location-in-moving network information managing unit 75 (address conversion table).

In step 408, the information transmitting unit 74 of the mobile node MN notifies the network management server NCPF of the generated mobile terminal MT #1 location information.

In step 409, the location information managing unit 81 of the network management server NCPF stores the mobile terminal MT #1 location information, and the routing table managing unit 82 updates the address conversion table (related to the prefix) of the mobility management router (AGR) 30 optimally selected in view of the moving characteristics of the moving network A.

In step 410, the information transmitting unit 84 of the network management server NCPF transmits information for creating an address conversion table related to the prefix, to the mobility management router (AGR) 30.

In step 411, a location information managing unit 31 of the mobility management router (AGR) 30 creates an address conversion table related to the prefix according to the information from the network management server NCPF.

In step 412, an information transmitting unit 31 transmits a reply showing the completion of creation of the address conversion table, to the network management server NCPF.

In step 413*a*, the network management server NCPF transmits a binding update including the mobile terminal MT #1 location information to the mobile node MN, and in step 413*b*, the network management server NCPF transmits the binding update to the mobility management router (AGR) 30.

In step 414, the location-in-moving network information managing unit 75 of the mobile node MN completes the update of mobile terminal MT #1 location information, and informs the mobile terminal MT #1 of the fact in reply. Then, the mobile terminal MT #1 can perform communication in the moving network A.

Second, with reference to FIG. 18, a packet transfer operation in the mobile communications system in this embodiment will be described.

Figure 18:
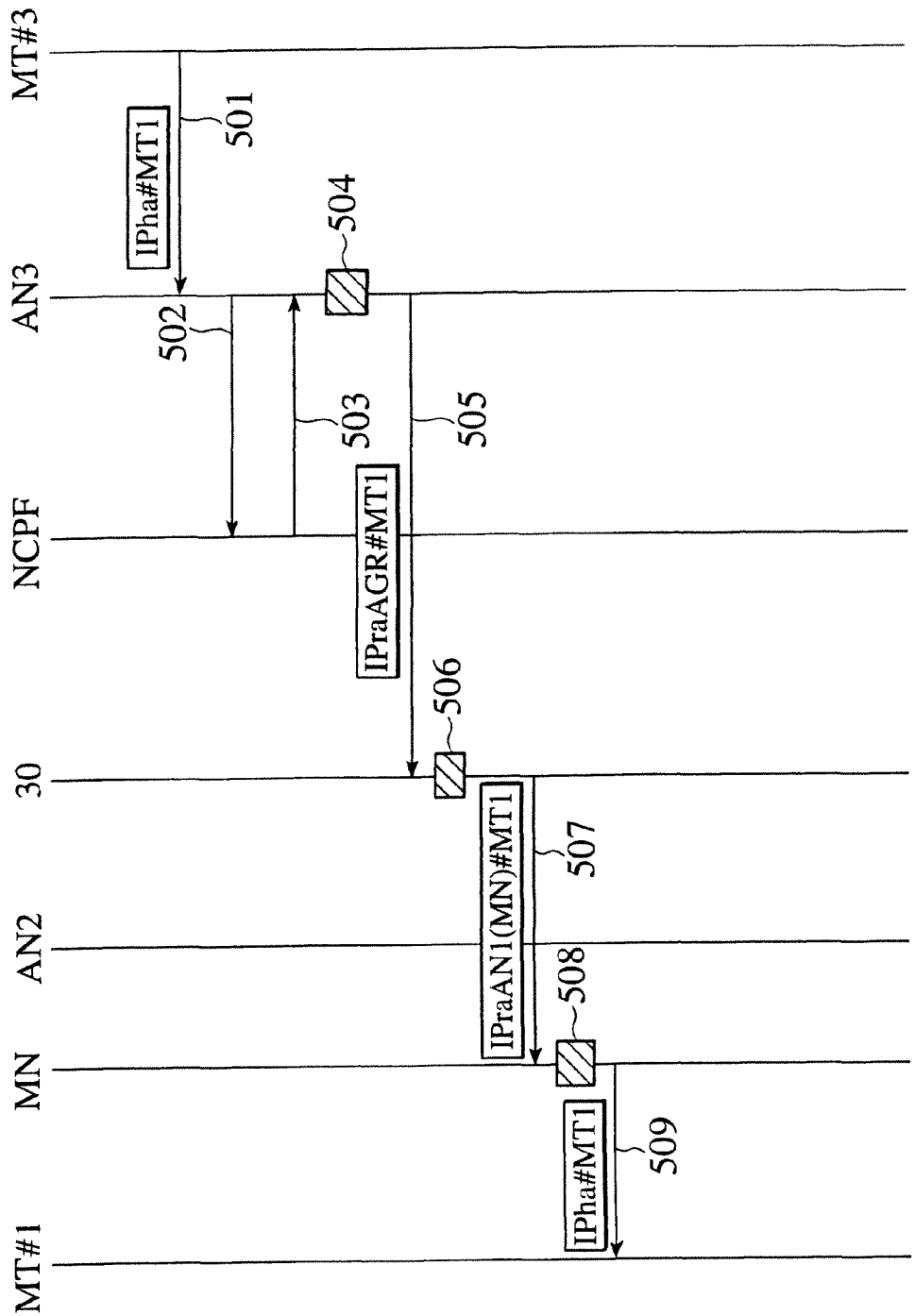
FIG. 18 is a sequence diagram illustrating a packet transfer operation in the mobile communications system according to the fifth embodiment of the present invention.

As shown in FIG. 18, in step 501, a mobile terminal MT #3 transmits packets including "IPha#MT1 (the home address of the mobile terminal MT #1)" as a destination address, to an access node AN 3.

In step 502, the access node AN 3 transmits an inquiry to the network management server NCPF for the first mobile terminal MT #1 routing information. In step 503, the information transmitting unit 84 of the network management server NCPF transmits a binding update for updating the address conversion table of the access node AN 3, to the access node AN 3.

In step 504, the access node AN 3 updates the address conversion table according to the received binding update, and converts the destination address of the received packets, into "IPraAGR#MT1 (a first routing address of the mobile terminal MT #1)". In step 505, the access node AN 3 transfers the packets with the converted address to the mobility management router (AGR) 30.

In step 506, a routing processing unit 34 of the mobility management router (AGR) 30 converts the destination address of the received packets into "IPraAN1 (MN) #MT1 (a second routing address of the mobile terminal MT #1)", referring to the address conversion table, and in step 507, the routing processing unit 34 transfers the packets with the converted address to the mobile node MN.

In step 508, the mobile node MN converts the destination address of the received packets into "IPha#MT1 (the home address of the mobile terminal MT #1)", referring to the address conversion table, and in step 509, the mobile node MN transfers the packets with the converted address to the mobile terminal MT #1.

Third, with reference to FIG. 19, an operation of changing mobile terminal MT #1 address information (location information) in the mobile communications system according to this embodiment will be described.

Figure 19:
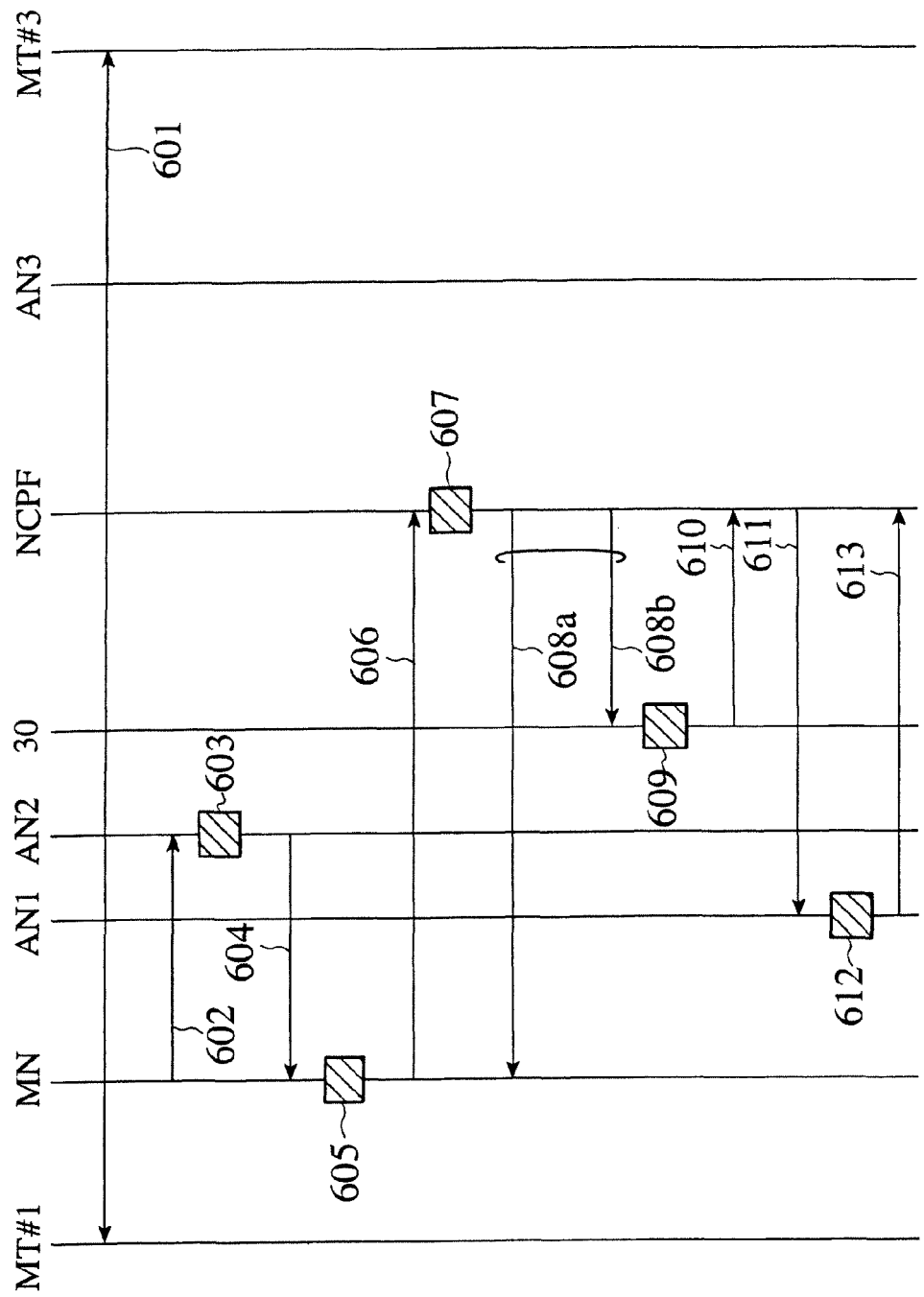
FIG. 19 is a sequence diagram illustrating an operation of changing mobile terminal address information of the mobile communications system according to the fifth embodiment of the present invention.

As shown in FIG. 19, in step 601, the mobile terminal MT #1 is communicating with the mobile terminal MT #3.

In step 602, when the moving network A moves, the information transmitting unit 74 of the mobile node MN transmits an inquiry to the destination access node AN 2 for a prefix (common information) assignable to the mobile terminals MTs located in the moving network A.

In step 603, the access node AN 2 selects a prefix (common information) assignable to the mobile terminals MTs located in the moving network A, and in step 604, the access node AN 2 sends the selected prefix (common information) to the mobile node MN in response.

In step 605, the location-in-moving network information managing unit 75 of the mobile node MN changes common information of location information of all the mobile terminals MTs located in the moving network A according to the selected prefix (common information).

In step 606, the information transmitting unit 74 of the mobile node MN transmits a notification that the location information of all the mobile terminals MTs located in the moving network A has been changed, to the network management server NCPF.

Here, only a signal showing that the common information has been changed is sent, resulting in a reduced amount of signals during handoff process.

In step 607, the location information managing unit 81 and the routing table managing unit 82 of the network management server NCPF change the common information of the location information of all the mobile terminals MTs located in the moving network A.

In step 608*a*, the information transmitting unit 84 of the network management server NCPF transmits to the mobile node MN a binding update on the location information of all the mobile terminals MTs located in the moving network A, and in step 608*b*, the information transmitting unit 84 transmits the binding update to the mobility management router (AGR) 30.

In step 609, the mobility management router (AGR) 30 updates the address conversion table in a location information managing unit 32 according to the received binding update, and in step 610, the mobility management router (AGR) 30 informs, in reply, the network management server NCPF of the completion of update of the address conversion table.

In step 611, the information transmitting unit 84 of the network management server NCPF transmits an instruction to the left access node AN 1 to delete the location information of all the mobile terminals MTs located in the moving network A.

In step 612, the access node AN 1 deletes the corresponding record from an address conversion table according to the deletion instruction from the network management server NCPF. In step 613, the access node AN 1 transmits a reply showing the completion of the deletion, to the network management server NCPF.

As described above, the present invention can provide a mobile communications system, a mobile communications method, a server, a transfer device and a mobile communications terminal for supporting moving networks, which allow significant reductions in the amount of signals and processing time during handoff process.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A mobile communications system for transferring packets to mobile communications terminals according to address information of the mobile communications terminals, the mobile communications terminals being located in a moving network connected to a given node in a core network, the mobile communication system comprising:
an address information manager configured to manage the address information of the mobile communications terminals located in the moving network, wherein
the address information of the mobile communications terminals include
common information related to the given node to which the moving network is connected, and
individual information which is unrelated to the given node to which the moving network is connected and which is unchanged when the connection to the given node to which the moving network is connected is changed to another node, and
the address information manager receives common information and individual information corresponding to one of the plurality of mobile communication terminals in the moving network and changes only the common information for all of the mobile communication terminals in the moving network to the received common information corresponding to the one of the plurality of mobile communication terminals based on the received common information and individual information corresponding to the one of the plurality of mobile communication terminals when the given node to which the moving network is connected is changed to another node.

2. A mobile communications method of transferring packets to mobile communications terminals according to address information of the mobile communications terminals, the mobile communications terminals being located in a moving network connected to a given node in a core network,
wherein the address information of the mobile communications terminals comprises common information related to the given node to which the moving network is connected and individual information unrelated to the given node to which the moving network is connected; and the method comprising:
detecting a change of the given node to which the moving network is connected, in a given mobile communications terminal located in the moving network;
changing the address information of all mobile communications terminals located in the moving network based on address information received from the given mobile communications terminal in response to the detecting, only by changing common information of the address information of the mobile communications terminals, in the given mobile communications terminal;
notifying the mobile communications terminals located in the moving network, of the change of the address information of the mobile communications terminals, in the given mobile communications terminal; and
notifying an address management device configured to manage address information of the mobile communications terminals located in the moving network of the change, in the given mobile communications terminal.

3. A mobile communications method of transferring packets to mobile communications terminals according to address information of the mobile communications terminals, the mobile communications terminals being located in a moving network connected to a given node in a core network,
wherein the address information of the mobile communications terminals comprises common information related to the given node to which the moving network is connected and individual information unrelated to the given node to which the moving network is connected; and the method comprising:
notifying a mobile node configured to manage the moving network of common information related to the given node, in the given node;
changing the address information of all mobile communications terminals located in the moving network based on address information received from the given node in response to the detecting, only by changing common information of the address information of the mobile communications terminals according to the notified common information, in the mobile node; and
notifying an address management device configured to manage the address information of the mobile communications terminals in the moving network, of the change of the address information of the mobile communications terminals, in the mobile node.

4. A server in a mobile communications system for transferring packets to mobile communications terminals according to address information of the mobile communications terminal, the mobile communications terminals being located in a moving network connected to a given node in a core network, the server comprising:
an address information manager configured to manage the address information of all mobile communications terminals located in the moving network, wherein
the address information of the mobile communications terminals include
common information related to the given node to which the moving network is connected, and
individual information which is unrelated to the given node to which the moving network is connected and is unchanged when the connection to the given node to which the moving network is connected is changed to another node, and
the address information manager receives common information and individual information corresponding to one of the plurality of mobile communication terminals in the moving network and changes only the common information for all of the mobile communication terminals in the moving network to the received common information corresponding to the one of the plurality of mobile communication terminals based on the received common information and individual information corresponding to the one of the plurality of mobile communication terminals when the given node to which the moving network is connected is changed to another node.

5. A transfer device provided on a packet transfer path in a mobile communications system for transferring packets to mobile communications terminals according to address information of the mobile communications terminals, the mobile communications terminals being located in a moving network connected to a given node in a core network, the transfer device comprising:
an address information manager configured to manage the address information of the mobile communications terminals located in the moving network, wherein
the address information of the mobile communications terminals includes common information related to the given node to which the moving network is connected and individual information unrelated to the given node to which the moving network is connected, and the address information manager receives common information and individual information corresponding to one of the plurality of mobile communication terminals in the moving network and changes only the common information for all of the mobile communication terminals in the moving network to the received common information corresponding to the one of the plurality of mobile communication terminals based on the received common information and individual information corresponding to the one of the plurality of mobile communication terminals when the given node to which the moving network is connected is changed to another node.

6. The transfer device as set forth in claim 5, further comprising:

an address converter configured to convert first common information of the address information of the mobile communications terminals into second common information of the address information of the mobile communications terminals within received packets, wherein the address information manager relates the first common information to the second common information.

7. A mobile communications terminal in a mobile communications system for transferring packets to mobile communications terminals located in the moving network connected to a given node in a core network according to address information of the mobile communications terminals, the mobile communications terminal comprising:

an address information manager configured to manage the address information of the mobile communications terminals located in the moving network, wherein the address information of the mobile communications terminals comprises common information related to the given node to which the moving network is connected and individual information unrelated to the given node to which the moving network is connected, and the address information manager receives common information and individual information corresponding to one of the plurality of mobile communication terminals in the moving network and changes only the common information for all of the mobile communication terminals in the moving network to the received common information corresponding to the one of the plurality of mobile communication terminals based on the received common information and individual information corresponding to the one of the plurality of mobile communication terminals when the given node to which the moving network is connected is changed to another node.

8. The mobile communications terminal as set forth in claim 7, wherein the address information manager notifies an address management device configured to manage the address information of the mobile communications terminals located in the moving network of the change of the address information.

* * * * *